US012040990B2

(12) United States Patent
Clemm et al.

(10) Patent No.: US 12,040,990 B2
(45) Date of Patent: Jul. 16, 2024

(54) PACKET PROGRAMMABLE FLOW TELEMETRY PROFILING AND ANALYTICS

(71) Applicant: HUAWEI TECHNOLOGIES CO., LTD., Guangdong (CN)

(72) Inventors: Alexander Clemm, Los Gatos, CA (US); Uma S. Chunduri, Fremont, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/951,440

(22) Filed: Nov. 18, 2020

(65) Prior Publication Data

US 2021/0075738 A1 Mar. 11, 2021

Related U.S. Application Data

(63) Continuation of application No. PCT/US2019/033580, filed on May 22, 2019.

(51) Int. Cl.
*H04L 47/41* (2022.01)
*G06F 9/50* (2006.01)
(Continued)

(52) U.S. Cl.
CPC ............ *H04L 47/41* (2013.01); *G06F 9/5016* (2013.01); *H04L 43/026* (2013.01); *H04L 47/20* (2013.01); *H04L 69/22* (2013.01)

(58) Field of Classification Search
CPC ....... H04L 47/41; H04L 43/026; H04L 47/20; H04L 69/22; H04L 41/0893;
(Continued)

(56) References Cited

U.S. PATENT DOCUMENTS

| 9,660,879 | B1 * | 5/2017 | Rothstein | ............... H04L 43/026 |
| 2002/0041590 | A1 * | 4/2002 | Donovan | ............... H04L 47/724 370/352 |

(Continued)

FOREIGN PATENT DOCUMENTS

| CN | 104363181 A | 2/2015 |
| CN | 105706393 A | 6/2016 |

(Continued)

OTHER PUBLICATIONS

Nobach et al. Statelet-Based Efficient and Seamless NFV State Transfer, IEEE Ransactions on Network and Service Management, vol. 14, No. 4, Dec. 2017.*

(Continued)

*Primary Examiner* — Harry H Kim
*Assistant Examiner* — Mohammed M Murshid
(74) *Attorney, Agent, or Firm* — Conley Rose, P.C.

(57) ABSTRACT

A mechanism is disclosed for performing implementing an operational flow profile. An initial packet is received that is associated with a flow. The initial packet contains a header including conditional commands related to an operational flow profile. The conditional commands are executed to initialize a state of an operational flow profile by allocating memory to store results of an aggregation function applied to the flow. A subsequent packet associated with the flow is received. The aggregation function is applied to the subsequent packet. Results of the aggregation function are stored to update the state of the operational flow profile.

16 Claims, 11 Drawing Sheets

(51) Int. Cl.
*H04L 43/026* (2022.01)
*H04L 47/20* (2022.01)
*H04L 69/22* (2022.01)

(58) Field of Classification Search
CPC . H04L 43/062; H04L 43/0852; H04L 41/142; H04L 41/5009; H04L 43/0876; H04L 43/50; G06F 9/5016; Y02D 30/50
See application file for complete search history.

(56) References Cited

U.S. PATENT DOCUMENTS

| | | |
|---|---|---|
| 2006/0285495 A1 | 12/2006 | Aitken et al. |
| 2007/0061433 A1 | 3/2007 | Reynolds et al. |
| 2008/0279207 A1* | 11/2008 | Jones ................. H04L 47/6235 370/412 |
| 2010/0138432 A1* | 6/2010 | Noyes ...................... G06F 7/02 709/224 |
| 2010/0268834 A1 | 10/2010 | Eidelman et al. |
| 2012/0259993 A1 | 10/2012 | Eidelman et al. |
| 2013/0148513 A1* | 6/2013 | Szabo .................. H04L 41/142 370/252 |
| 2013/0286824 A1* | 10/2013 | Rangaprasad .......... H04L 45/38 370/230 |
| 2015/0010000 A1 | 1/2015 | Zhang et al. |
| 2015/0124837 A1 | 5/2015 | Saltsidis et al. |
| 2016/0119163 A1* | 4/2016 | Fadeev ............. H04M 15/8044 370/328 |
| 2016/0142269 A1* | 5/2016 | Konduru ................. H04L 41/12 709/224 |
| 2017/0302539 A1* | 10/2017 | Park ........................ H04L 43/50 |
| 2017/0359262 A1 | 12/2017 | Adams |
| 2018/0279142 A1 | 9/2018 | Mustajarvi |
| 2018/0367321 A1* | 12/2018 | Stammers ............... H04W 4/24 |
| 2019/0079897 A1* | 3/2019 | Kochevar-Cureton ...................... H04L 12/4641 |
| 2019/0104075 A1* | 4/2019 | Li ........................... H04L 47/32 |

FOREIGN PATENT DOCUMENTS

| | | |
|---|---|---|
| CN | 105991338 A | 10/2016 |
| CN | 107302501 A | 10/2017 |
| CN | 107534572 A | 1/2018 |
| WO | 2016152080 A1 | 9/2016 |

OTHER PUBLICATIONS

Li, R., et al.; U.S. Appl. No. 62/565,211; Title: "Self-Driving Packets with Conditional Instructions"; filed Sep. 29, 2017.

\* cited by examiner

PACKET PROGRAMMABLE FLOW TELEMETRY PROFILING AND ANALYTICS

CROSS-REFERENCE TO RELATED APPLICATIONS

This patent application is a continuation of International Application No. PCT/US2019/033580, filed May 22, 2019 by Alexander Clemm, et. al., and titled "Packet Programmable Flow Telemetry Profiling And Analytics," which claims the benefit of U.S. Provisional Patent Application No. 62/681,527, filed Jun. 6, 2018 by Alexander Clemm, et. al., and titled "Packet-programmable Flow Telemetry Profiling And Analytics," which are each hereby incorporated by reference.

TECHNICAL FIELD

The present disclosure is generally related to network management, and is specifically related to employing in-band signaling to manage operational flow profiles that apply aggregation functions to packets traversing a network as part of a flow.

BACKGROUND

Networks may wish to analyze and classify both encrypted and unencrypted traffic. Such analysis may be employed for security and threat detection, for example for use in detecting malicious flows that may spread malware. Such analysis may also be employed as part of network planning and performing usage analysis, for example as part of developing an understanding of how users are utilizing network resources. As a specific example, fingerprinting involves generating a flow profile, and then comparing the flow profile with other known profiles that are characteristic of specific types of traffic in order to assess their similarity to perform proper categorization. In some cases network profiling may involve generating test traffic to simulate actual traffic, and then performing measurement on such test traffic. In other cases, network profiling may involve exporting traffic to an external system for analysis. In addition, diagnosing things such as fluctuations in delay or occurrence of packet drops may involve profiling of various operational parameters and device telemetry encountered by packets during the flow.

SUMMARY

In an embodiment, the disclosure includes a method implemented in a network element (NE). The method comprises receiving, by a receiver of the NE, an initial packet associated with a flow, the initial packet containing a header including conditional commands related to an operational flow profile. The method further comprises executing, by a processor at the NE, the conditional commands to initialize a state of an operational flow profile by allocating memory of the NE to store results of an aggregation function applied to the flow. The method further comprises receiving, by the receiver, a subsequent packet associated with the flow. The method further comprises applying, by the processor, the aggregation function to the subsequent packet. The method further comprises storing, in the memory, results of the aggregation function to update the state of the operational flow profile. In some example networks, network traffic is analyzed by exporting traffic to an external server and then analyzing the traffic patterns. This approach has privacy concerns (e.g., is effectively packet sniffing), is delayed (e.g., doesn't use live traffic), and cannot indicate the effect that managing the flow has on corresponding hardware that is actually performing routing functions. The disclosed embodiments employ self-driving packets that contain executable code in the header to setup an operational flow profile on the routing nodes. The present embodiment describes the action of a node along the path of a flow that is configured to execute an operational flow profile based on instructions from an edge node. The node can then apply aggregation functions (e.g., generate histograms) based on live traffic related to a flow. The output of such functions can be useful to proactively profile a flow for resource provisioning purposes. Such output can also be used reactively to determine a reason that a flow is receiving service level degradation (e.g. packet drops). Such output can also be used to monitor for flows that have been compromised by a malicious actor. Further, an operational flow profile can be created by an administrator dynamically to provide relevant metrics (e.g., similar to a query) rather than employing a customized software update for a particular issue, which may take significant development time.

Optionally, in any of the preceding aspects, another implementation of the aspect provides, wherein the conditional commands in the initial packet include commands that specify operations to update the state of the operational flow profile in order to implement the aggregation function, the method further comprising storing the commands that specify operations to update the state of the operational flow profile in the memory. For example, the commands for updating the operational flow profile can be stored in cache memory as part of a statelet and applied to each packet of the flow.

Optionally, in any of the preceding aspects, another implementation of the aspect provides, wherein a plurality of packets of the flow include conditional commands that specify operations to update the state of the operational flow profile in order to implement the aggregation function, and wherein the operations to update the state of the operational flow profile are not stored in the memory. For example, the memory can contain only state information, and further packets can include the commands to implement the aggregation function for the corresponding packet.

Optionally, in any of the preceding aspects, another implementation of the aspect provides, wherein at least one packet of the flow includes a policy describing a mechanism to remove the state of the operational flow profile, the method further comprising storing the policy to remove the state of the operational flow profile in the memory. For example, the conditional commands can indicate when and how to tear down the operational flow profile. These commands can be stored as part of the statelet.

Optionally, in any of the preceding aspects, another implementation of the aspect provides, wherein at least one packet of the flow includes conditional commands that specify operations to remove the state of the operational flow profile, and wherein the operations to remove the state of the operational flow profile are not stored in the memory. For example, the commands indicating when and how to tear down the operational flow profile can be included in further packets that trigger such events.

Optionally, in any of the preceding aspects, another implementation of the aspect provides, wherein at least one packet of the flow includes commands that specify operations to export the state of the operational flow profile, the method further comprising storing the commands that specify operations to export the state of the operational flow profile in the memory. For example, the conditional commands can indicate when and how to export the operational flow profile. These commands can be stored as part of the statelet.

Optionally, in any of the preceding aspects, another implementation of the aspect provides, wherein at least one packet of the flow includes conditional commands that specify operations to export the state of the operational flow profile, and wherein the operations to export the state of the operational flow profile are not stored in the memory. For example, the conditional commands that indicate when and how to export the operational flow profile can be included in further packets that trigger such events.

Optionally, in any of the preceding aspects, another implementation of the aspect provides, wherein at least one packet of the flow includes conditional commands that indicate the operational flow profile is applicable to one or more nodes in a network along a path of the flow. For example, the conditional commands can specify the node(s) to execute the operational flow profile.

Optionally, in any of the preceding aspects, another implementation of the aspect provides, wherein the aggregation function includes matching a target data item against a bucket criteria, updating a set of counters representing buckets in a histogram based on the bucket criteria, and generating the histogram based on the counters.

Optionally, in any of the preceding aspects, another implementation of the aspect provides, wherein the aggregation function measures packet data, flow telemetry, NE hardware statistics, NE hardware telemetry, or combinations thereof.

In an embodiment, the disclosure includes a method implemented in a NE. The method comprises obtaining, by a processor of the NE, conditional commands to initialize a state of an operational flow profile in memory at a node in a network along a path of a flow, the operational flow profile initialized to store results of an aggregation function applied to the flow. The method further comprises appending, by the processor, the conditional commands to an unencrypted header of an initial packet associated with the flow. The method further comprises transmitting, by a transmitter of the NE, the initial packet into the network along the path of the flow. In some example networks, network traffic is analyzed by exporting traffic to an external server and then analyzing the traffic patterns. This approach has privacy concerns (e.g., is effectively packet sniffing), is delayed (e.g., doesn't use live traffic), and cannot indicate the effect that managing the flow has on corresponding hardware that is actually performing routing functions. The disclosed embodiments employ self-driving packets that contain executable code in the header to setup an operational flow profile on the routing nodes. The present embodiment describes the action of an edge node that manages such operation flow profiles on nodes in the network. The nodes in the network can then apply aggregation functions (e.g., generate histograms) based on live traffic related to a flow. The output of such functions can be useful to proactively profile a flow for resource provisioning purposes. Such output can also be used reactively to determine a reason that a flow is receiving service level degradation (e.g. packet drops). Such output can also be used to monitor for flows that have been compromised by a malicious actor. Further, an operational flow profile can be created by an administrator dynamically to provide relevant metrics (e.g., similar to a query) rather than employing a customized software update for a particular issue, which may take significant development time.

Optionally, in any of the preceding aspects, another implementation of the aspect provides, wherein the conditional commands in the initial packet include commands that specify operations to update the state of the operational flow profile in order to implement the aggregation function, the conditional commands directing the node to store the commands that specify operations to update the state of the operational flow profile in memory at the node. For example, the commands for updating the operational flow profile can be stored in cache memory as part of a statelet and applied to each packet of the flow.

Optionally, in any of the preceding aspects, another implementation of the aspect provides, further comprising appending conditional commands that specify operations to update the state of the operational flow profile in a plurality of packets of the flow in order to implement the aggregation function, wherein the conditional commands do not direct the node to store operations to update the state of the operational flow profile in memory at the node. For example, the memory can contain only state information, and further packets can include the commands to implement the aggregation function for the corresponding packet.

Optionally, in any of the preceding aspects, another implementation of the aspect provides, wherein at least one packet of the flow includes a policy describing a mechanism to remove the state of the operational flow profile, the method further comprising storing the policy to remove the state of the operational flow profile in the memory. For example, the conditional commands can indicate when and how to tear down the operational flow profile. These commands can be stored as part of the statelet.

Optionally, in any of the preceding aspects, another implementation of the aspect provides, further comprising appending conditional commands to at least one packet of the flow that specify operations to remove the state of the operational flow profile, wherein the conditional commands do not direct the node to store the operations to remove the state of the operational flow profile in memory at the node. For example, the commands indicating when and how to tear down the operational flow profile can be included in further packets that trigger such events.

Optionally, in any of the preceding aspects, another implementation of the aspect provides, wherein at least one packet of the flow includes conditional commands that specify operations to export the state of the operational flow profile, the conditional commands directing the node to store the commands that specify operations to export the state of the operational flow profile in memory at the node. For example, the conditional commands can indicate when and how to export the operational flow profile. These commands can be stored as part of the statelet.

Optionally, in any of the preceding aspects, another implementation of the aspect provides, further comprising appending conditional commands to at least one packet of the flow that specify operations to export the state of the operational flow profile, wherein the conditional commands do not direct the node to store the operations to export the state of the operational flow profile in memory at the node. For example, the conditional commands that indicate when and how to export the operational flow profile can be included in further packets that trigger such events.

Optionally, in any of the preceding aspects, another implementation of the aspect provides, further comprising appending conditional commands to at least one packet of the flow that indicate the operational flow profile is applicable to one or more nodes in the network along the path of the flow. For example, the conditional commands can designate the node(s) that should execute the operational flow profile.

Optionally, in any of the preceding aspects, another implementation of the aspect provides, wherein the aggregation function includes matching a target data item against a bucket criteria, updating a set of counters representing buckets in a histogram based on the bucket criteria, and generating the histogram based on the counters.

Optionally, in any of the preceding aspects, another implementation of the aspect provides, wherein the aggregation function measures packet data, flow telemetry, NE hardware statistics, NE hardware telemetry, or combinations thereof.

In an embodiment, the disclosure includes a NE comprising a processor, a transmitter coupled to the processor, and a receiver coupled to the processor. The processor, transmitter, and receiver are configured to perform the method of any of the preceding aspects.

In an embodiment, the disclosure includes non-transitory computer readable medium comprising a computer program product for use by a NE. The computer program product comprises computer executable instructions stored on the non-transitory computer readable medium such that when executed by a processor cause the NE to perform the method of any of the preceding aspects.

In an embodiment, the disclosure includes a NE comprising: a receiving module for receiving an initial packet associated with a flow and a subsequent packet associated with the flow, the initial packet containing a header including conditional commands related to an operational flow profile; an initialization module for executing the conditional commands to initialize a state of an operational flow profile by allocating memory of the NE to store results of an aggregation function applied to the flow; an application module for applying the aggregation function to the subsequent packet; and a storage module for storing results of the aggregation function to update the state of the operational flow profile.

In an embodiment, the disclosure includes a NE comprising: a conditional command module for obtaining conditional commands to initialize a state of an operational flow profile in memory at a node in a network along a path of a flow, the operational flow profile initialized to store results of an aggregation function applied to the flow; a header appending module for appending the conditional commands to an unencrypted header of an initial packet associated with the flow; and a transmitting module for transmitting the initial packet into the network along the path of the flow.

Optionally, in any of the preceding aspects, another implementation of the aspect provides, wherein the NE is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
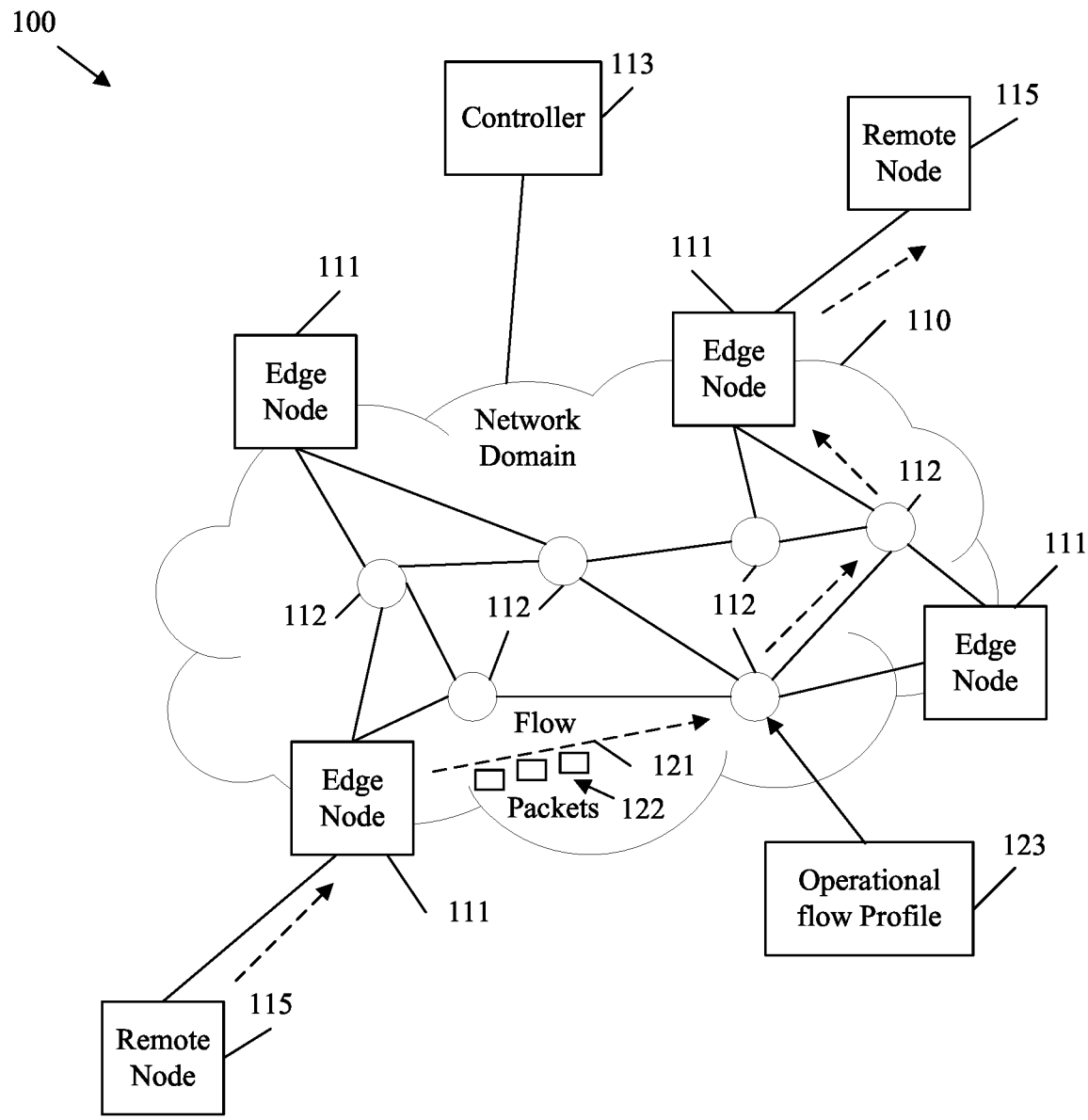
FIG. 1 is a schematic diagram of an example network for implementing operational flow profiles.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following are definitions for several terms as used in the present disclosure. Big Packet Protocol (BPP) is a network communication protocol used for implementing self-driving packets and packet-programmable statelets. A self-driving packet is a data packet that contains a block or set of fields that define a set of conditional commands used to guide processing of the packet by a forwarding device (e.g., a network node such as a router). A conditional command is a command whose execution depends on a condition being met. It should be noted that a conditional command may be treated by a network as an unconditional command by setting a condition that always evaluates to true. A flow key is a set of characteristics that are used to associate packets with a flow, for example, a combination of packet fields (e.g., source, destination), a flow identifier (ID), and/or other special marking(s). In-situ Operations, Administration, and Maintenance (IOAM) is a mechanism by which a sampling of telemetry data can be attached to a packet as the packet traverses a network. Internet protocol (IP) is a communications protocol used for relaying data packets across network boundaries. Software Defined Network (SDN) is a network that separates control plane functions and data plane functions by placing the control plane in a controller. The controller may be centralized and may dynamically configure/program network nodes at runtime. A statelet is a segregated portion of memory maintained on a packet forwarding device, the memory configured to contain data that is associated with and can interact with self-driving packets in a data flow. A Two-Way Active Measurement Protocol (TWAMP) is a protocol for measuring network performance between any two devices in a network that support protocols associated with a TWAMP framework.

Generating a flow profile involves determining flow statistics such as a number of packets or an average size of packets in a flow. However, flow profiles can also involve measuring items that are not maintained as part of a flow cache and that cannot be obtained as part of flow records, such as the distribution of packet sizes or spacing patterns of packets in a flow. Moreover, other types of characteristics might become of interest dynamically and on the fly. Obtaining such profiles may involve capturing packets and exporting them to an external system that stores the packets and runs analysis on them. There are many limitations to this approach, including the volume of data that is generated, exported, and collected, scalability of processing the data, as well as privacy and regulatory concerns as packet capture may amount to eavesdropping. Further, such systems may be impractical for managing dynamic issues, as exporting data for analysis is often associated with a significant delay on the order of days to weeks.

Disclosed herein are mechanisms to implement operational flow profiles in real time on an active network. The operational flow profiles can perform analysis on live traffic. For example, an edge node and/or a node that is external to a network can generate conditional commands to create and/or manage an operational flow profile. Such commands can then be appended to the header of a packet carrying live data as part of a data flow. In some examples, the conditional commands apply to specified nodes along the path of the flow. In other examples, the conditional commands apply to any node along the path of the flow. The conditional commands can also include conditions that should be met to initiate the commands. For example, the conditional commands may indicate that an operational flow is created upon the occurrence of a specified condition, such as upon a specified link utilization, a packet drop, a queue occupancy, etc. In order to manage an operational flow profile, the conditional commands may contain directions indicating an initial profile state of the operational flow profile. The conditional commands may also indicate processes to employ in order to update the profile state and/or conditions to employ when determining whether to update the profile state. The conditional commands may also indicate when a profile state should be exported and how the profile state should be exported (e.g., to an external node, such as a controller). The conditional commands can also indicate processes to be undertaken to remove the profile state and tear down the operational flow profile and/or conditions to initiate such removal. Such conditional commands can be included in a single packet header, spread amongst multiple packet headers for multiple flow packets, included in packet headers for all packets in a flow, or combinations thereof. For example, a conditional command to initialize the operational flow profile can be forwarded with a first packet. The commands can then cause an internal node to initialize a profile state in cache memory, for example as part of a statelet. The commands can also indicate when and how to update the profile state, and such information can be stored in the cache memory. The internal node can then apply indicated functions. At the end of a specified time or on occurrence of an event, the edge node can send additional conditional commands toward the internal node as part of another packet header. Such commands can direct the internal node to export the profile state and remove the profile. In another example, the first packet can initialize the profile state. The first packet and each subsequent packet can also include conditional commands indicating when and how to update the profile state. The internal node may not store such commands, but may execute the commands upon receipt. In such an example, the internal node may perform different updates depending on the packet received. Many other combinations and/or permutations can be employed. In any case, profile state commands can be included in headers for single packets and/or in headers for multiple packets, and may or may not be stored in the cache memory at the node(s) operating the operational flow profile. For example, the operational flow profiles may be employed to apply aggregation functions, for example to generate and export a histogram. Such aggregation functions can be applied to measured properties of packets (e.g., packet size), device hardware statistics, or combinations thereof. Specifically, aggregation function is a function that aggregates data, and the aggregation function can be applied to various types of data as described herein. For example, the aggregation functions can be applied to data related to properties of packets in a flow (e.g. packet size of packets in the flow), to telemetry (e.g. egress queue occupancy encountered by a packet in a flow), to device statistics (e.g. interface utilization). Examples of aggregation functions include average functions, minimum functions, maximum functions, count functions, and functions that maintain histograms. As used herein, telemetry indicates the reading of measurement data related to a device and/or flow.

The output of the operational flow profiles can then be used for network management decisions and/or as an input to other functions. For example, an operational flow profile can be generated to compare a flow profile with known profiles. As a specific example, a flow profile of an active flow can be compared to a flow profile associated with malware or other malicious network activity. In this way, the flow can be flagged as malicious without reviewing the underlying packet data, and hence without violating the privacy of the associated systems and users. Further, the flow can be tested in real time without significantly affecting the service provided to the flow until a determination is made. In another example, the output of the operational flow profile can be used to perform network diagnostics and/or inform network provisioning. For example, one or more operational flow profiles can be created to diagnose the cause of packet drops in real time on a live flow. As a specific example, an operational flow profile that indicates many packets are experiencing a high interface utilization may be used to determine that packet drops for a particular flow occurring at a specific device in the network are likely caused by over-utilized interfaces (e.g., transmitters, receivers, ports, etc.), and hence flows should be rerouted and/or more interfaces should be provisioned to fix the packet drop issue. As yet another example, an operational flow profile that indicates packets commonly encounter high queue occupancy (and hence long wait times for re-transmission) can be used to determine that the current resource reservation is insufficient for the flow and that more resources should be added. Multi-dimensional operational flow profiles can even be employed to compare multiple data sets for more complicated decision making. As such, operational flow profiles can be used to provide real time analysis of the traffic conditions in a network. Further, operational flow profiles can gather useful network metrics without violating privacy. In addition, new types of operational flow profiles can be generated dynamically by a single programmer (using the disclosed mechanisms) in a short time period (e.g., minutes to hours) instead of relying on a development team to develop a software component to extract and aggregate specific information in a certain way to address a particular network issue (e.g., which may take weeks to months and incur significant expense). Hence, operational flow profiles create additional functionality at the network nodes along the flow path, and allow such nodes to provide actionable telemetry and analytics in a manner that employs fewer computational, memory, and network resources than other network traffic analytics mechanisms.

Accordingly, the present disclosure provides mechanisms that allow flows to be profiled within the network without having to rely on external systems. Such mechanisms provide such functionality in a way that allows profiles to be dynamically programmed. This includes providing an indication of data to be profiled and indications of how such profiling should be performed. Further, such mechanisms may apply different profiles to different flows. By leveraging self-driving packets with conditional commands, as well as packet-programmable statelets, flow profiles can be programmed from the edge of the network without needing to program individual network nodes. This disclosure employs operational flow profiles. An operational flow profile takes a profile of operational characteristics that are encountered during processing of a flow, for example a distribution/histogram of link utilization, egress queue depth, memory utilization, etc. that are encountered while processing individual packets. More advanced operational flow profiles can record a distribution/histogram of such parameters under certain conditions, for example link utilization and/or egress queue depth when packets of a certain size are encountered or when a certain packet inter-arrival delay is exceeded.

Such operational flow profiles can help users and operators diagnose causes for service level degradations, including delay, jitter, and packet loss. Other network tools may be insufficient in that regard. For example, some tools provide fixed sets of static information elements that cannot be programmed or changed by users. Other tools can be used to collect selected telemetry for packets as they traverse the network, but the telemetry that can be obtained is fixed (not freely programmable), and each packet may create a separate data record that is then exported and processed externally. In such tools, no aggregation or profiling across packets of a given flow takes place, which may result in potentially millions of records that are then exported to generate a single profile. In contrast, the mechanisms proposed here are more powerful and advanced (e.g., more customizable and provide more available functionality). The disclosed mechanisms allow the generation of custom profiles of flows in a network. A custom profile includes an aggregation function that may be applied for each packet of a flow and an associated set of data that is aggregated based on the results of the aggregation function. Such aggregation functions may include histograms, max functions, top number (top-n) functions, mean functions, etc.

The data that is aggregated can include data about the packet, such as the packet size, data about device stats, such as the current interface utilization, data about device telemetry, such as egress queue occupancy, data about the flow telemetry, such as time from the previous packet, etc. Custom profiles can furthermore be refined to only apply the aggregation when certain conditions are met. For example, distributions and/or histograms can be generated for link utilization, egress queue depth, and/or memory utilization while processing packets. Further, distribution and/or histograms can be generated under certain conditions, such as distribution link utilization/egress queue depth, etc. when packets of a certain size are encountered, when a certain inter-arrival delay is exceeded, etc. The operational flow profile can be processed in a number of ways. For example, the operational flow profile can be exported to an external controller, collector, and/or edge device, and/or the operational flow profile can serve as input to other functions within the device itself (e.g., the network node along the flow path). This information may assist an operator or a user in understanding and explaining possible causes for service level degradations, validate proper reservation of resources, and more. This disclosure provides a solution to determine operational flow profiles, with many uses by applications related to network monitoring, troubleshooting, assurance, and optimization.

FIG. 1 is a schematic diagram of an example network 100 for implementing operational flow profiles 123. The network 100 may be operated by a service provider or other provider of networking services, such as enterprise network service providers, information technology departments, data center providers, etc. The network 100 includes a network domain 110 coupling remote nodes 115. The network domain 110 includes edge nodes 111 that act as ingress and egress points and internal nodes 112 that communicate data, such as a data flow 121 of data packets 122. In some examples, the network 100 may optionally include a controller 113, such as a software defined network (SDN) controller to manage network routing.

Remote nodes 115 are nodes that operate applications and wish to communicate with each other. For example, remote nodes 115 may include servers, clients, and/or other computers with a network interface. Such remote nodes 115 may communicate with each other by transmitting data flows 121 via a network domain 110. A data flow 121 is a group of related communications between a common set of end points, such as remote nodes 115. A data flow 121 can be recognized by a node 111, 112, and/or 115 as a set of data packets 122 that share common values of key fields, such as the same source IP address, destination IP address, source port address, and destination port address. As a particular example, applications operating on the remote nodes 115 can initiate a communication session. The data exchanged between the remote nodes 115 during the communication session may be transmitted as a data flow 121. The data in the data flow 121 is separated into data packets 122 for transmission. The data flow 121 may employ a flow key, which is a set of data packet characteristics that are used by the network domain 110 to associate data packets 122 with a data flow 121. For example, the flow key may include combinations of data packet fields that indicate flow membership. Such fields may include the source IP address, destination IP address, source port address, and destination port address. Other key fields may also be used. A data packet 122 includes a header with routing information, such as a flow key, and a payload with the data exchanged between the remote nodes 115. The payload may be encrypted in some cases, and may not be readable by the network domain 110 connecting the remote nodes 115.

The data flow 121 is exchanged between the remote nodes 115 via a network domain 110 operated by a service provider. A network domain 110 is a group of interconnected network components controlled by a common set of networking policies. The network domain 110 includes edge nodes 111, internal nodes 112, and links. The edge nodes 111 are network devices capable of converting data packets 122 into a form that complies with the policies of the network domain 110. For example, the edge nodes 111 may implement security policies for the network domain 110, change data packet 122 network addresses according to network domain 110 addressing schemes, manage pathing through the network domain 110 for the data flow 121, etc. Hence, the edge nodes 111 act as ingress and egress points into the network domain 110. As a particular example, the edge nodes 111 may determine path(s) across the network domain 110, encapsulate the packets 122 to cause the packets 122 to proceed through the network domain 110 via tunnels, etc. The edge nodes 111 are interconnected by a series of internal nodes 112 and corresponding links, depicted as lines. The internal nodes 112 are network devices, such as routers, that are configured to read data packet 122 header information and forward the data packets 122 according to the header information. The edge nodes 111 and the internal nodes 112 may also contain flow caches which maintain context information related to the data flow 121. For example, a flow cache may contain a flow cache entry associated with each data flow 121 traversing the node containing the flow cache. The flow cache entry may contain data flow 121 duration information, start time, a source address, a destination address, a number of packets 122 transmitted, an amount of data transmitted in the flow, and/or other data flow 121 related information.

In some cases, network domain 110 routing functions and data management functions may be disaggregated and spread amongst various edge nodes 111 and/or internal nodes 112 throughout the network domain 110. In other cases, the network domain 110 may include a controller 113, which is a network device configured to make routing decisions and manage network 100 operations. For example, when the network domain 110 is configured as an SDN, the controller 113 is an SDN controller. When a controller 113 is not present, a remote node 115 may initiate communications by contacting an edge node 111 to determine and setup a route for the data flow 121 through the network domain 110. When a controller 113 is present, the remote node 115 may contact the edge node 111, which then contacts the controller 113 to initiate routing for the data flow 121. The controller 113 maintains an awareness of network domain 110 resources, and is configured to determine network routes for the data flow 121. The controller 113 can provide commands to the edge node 111 indicating the route to be used for the data flow 121. It should be noted that many different network 100 configurations can be employed by a service provider. The foregoing is provided as an example of a general data packet 122/data flow 121 routing approach for clarity of discussion and should not be considered limiting.

The network domain 110 may employ conditional commands to manage handling of the data packets 122. For example, the conditional commands allow the packets 122 to direct how the packets 122 should be routed (e.g., self-driving) instead of relying on network policies at the internal nodes 112 and/or edge nodes 111. A conditional command is placed in/attached to the packet 122 header by the edge node 111 acting as an ingress node (e.g., the head-end node). The conditional command includes a condition, a command, and may also include one or more parameters. The condition indicates an item that must be satisfied before the command is executed. When the condition is not met, the command is ignored. The command indicates an action or actions to be taken by the node processing the data packet 122 upon occurrence of the condition. The parameters, when present, further clarify the condition, the command, or both.

Conditional commands can also be employed to implement operational flow profiles 123. An operational flow profile 123 is an aggregation mechanism that performs measurements on packets 122, a flow 121, and/or nodes 111 and/or 112 along the path of the flow 121 and reports corresponding results. The operational flow profile 123 can be implemented on one or more nodes 111 and/or 112 along the path of the flow 121. For example, a network administrator may determine to analyze data packets 122, the flow 121, and/or the impact of corresponding traffic on the nodes 111 and/or 112 along the path of the flow 121. As specific examples, the network administrator may wish to analyze the flow 121 to check for malware, to address network errors, and/or to manage network provisioning. The network administrator can generate and/or request the generation of conditional commands to implement operational flow profile(s) 123 to perform such an analysis. Such commands can be generated by and/or sent to an edge node 111 acting as an ingress node for the flow 121. The ingress edge node 111 can then append the conditional command(s) on the data packets 122 of the data flow 121 as such packets 122 enter the network domain 110. The internal nodes 112 obtain the conditional commands from the packets 122 during routing. When the condition(s) for the conditional command(s) are met, the internal node(s) 112 and/or edge node(s) 111 processing the packets 122 can execute the associated command(s). Conditional commands for managing operational flow profiles 123 may be complementary commands that are executed in addition to the stored routing commands, and hence may be considered to be non-blocking commands.

Specifically, a set of conditional commands can be employed in conjunction with programmable packets 122 in order to generate a custom operational flow profile 123 for the corresponding flow 121. The set of conditional commands can specify a mechanism to initialize a profile state for the operational flow profile 123 when no such state is present on the corresponding node(s) 111 and/or 112. This may include initializing a statelet with an empty profile. A statelet is a programmable data structure on a node 111 and/or 112 that maintains state data for a data flow 121. The statelet may be implemented in a statelet cache, which is a portion of cache memory dedicated for maintaining state data for a data flow 121 in a manner similar to a flow cache. A statelet cache may be programmed and/or reprogrammed at run time by the conditional command(s) to maintain data in a desired form to suit the purposes of the operational flow profile 123. The set of conditional commands can also specify a mechanism to update the profile state of the operational flow profile 123 as well as associated conditions, if any. This may involve updating the profile state with telemetry that is observed for a current packet 122. For example, a histogram may be updated by incrementing the count of a particular bucket in memory. The set of conditional commands can also specify mechanisms for exporting a profile state of the operational flow profile 123. This may involve indicating when such an export should occur and the destination of such an export. The set of conditional commands can also specify mechanisms for removing a profile state for the operational flow profile 123 as well as further actions to take upon removal, if any. For example, this may involve specifying an inactivity timer after which the statelet is removed, for example with an expiration action such as exporting the profile to a specified destination. The conditional commands can also include conditions that must apply before such commands are executed. Accordingly, the conditional commands can indicate that specified nodes 111 and/or 112 are to maintain the operational flow profile 123. This may include any node 111 and/or 112, an egress edge node 111, a specified internal node 112, and/or any node 111 and/or 112 tagged in a particular way. The conditional commands can also indicate any other conditions that must be met for the commands to apply. For example, such conditions can be employed to create complex operational flow profile 123 functionality (e.g., a flow state may only be updated for packet of a specified size, etc.)

As noted above, such commands can be carried in self-driving packets 122 by having an ingress edge node 111 append such commands to an unencrypted packet header. The commands are then executed by corresponding node infrastructure. For example, the node infrastructure of network 100 and the packets 122 can be configured according to BPP. BPP is a protocol and framework that provides support for self-driving packets and packet-programmable statelets. A BPP data packet 122 may include a command block and/or metadata in addition to other header information. Upon entering the network domain 110, the edge node 111 may add metadata including the conditional commands to the data packet 122. The other nodes 111 and/or 112 along the path of the flow 121 can then read the metadata and setup operational flow profile(s) 123 depending on the conditions set in the packets 122.

The disclosed mechanisms presume that flow 121 key and/or flow 121 membership of a packet 122 can be determined by the nodes 111 and 112. For example, unencrypted headers expose IP flow key fields (e.g., in Transport Layer Security (TLS) based communications). In another example, the edge nodes 111 can apply markings to packets 122 as belonging to a corresponding flow 121. Such markings can then be read and acted upon by internal nodes 112.

Figure 2:
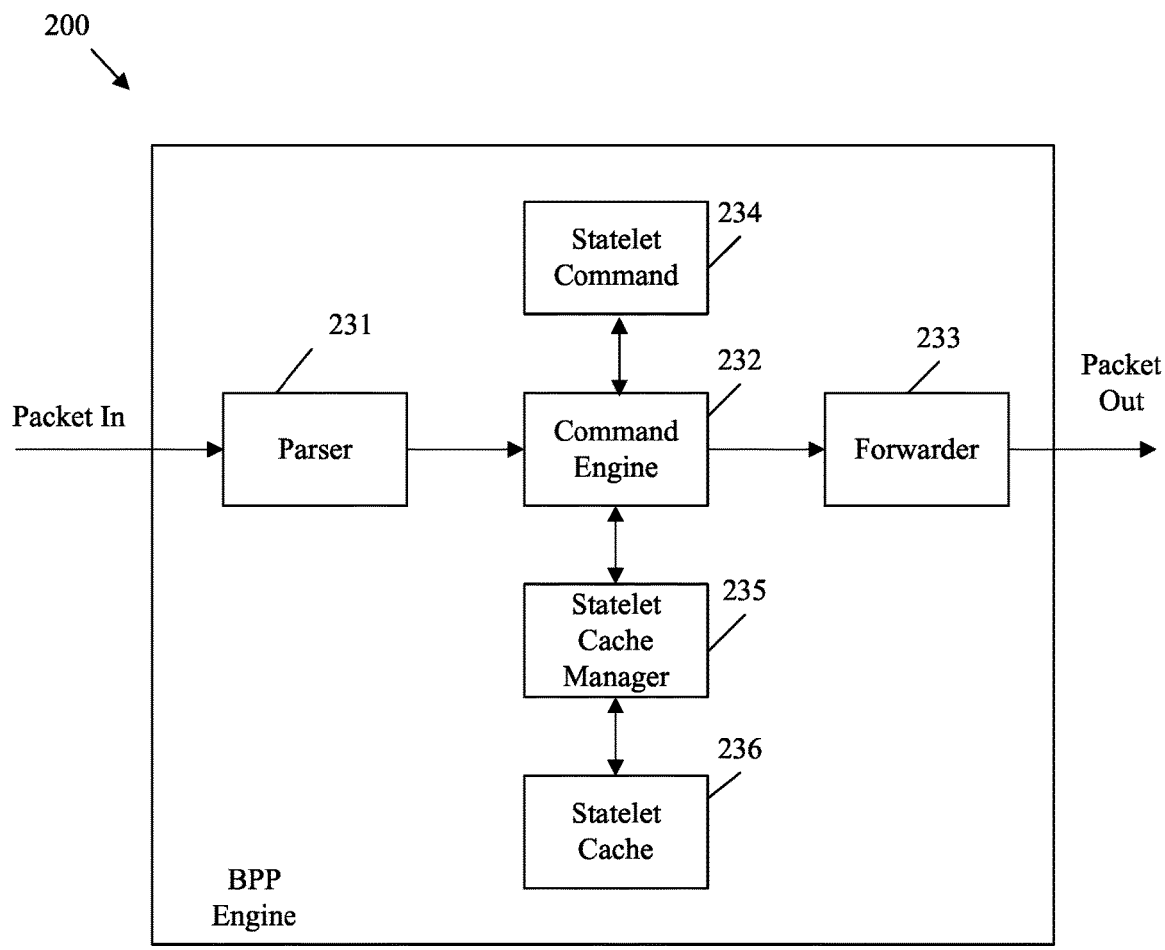
FIG. 2 is a schematic diagram of an example packet processing engine for implementing operational flow profiles.

FIG. 2 is a schematic diagram of an example packet processing engine 200 for implementing operational flow profiles, such as operational flow profile 123. For example, packet processing engine 200 may operate on an edge node 111 and/or an interior node 112 in network 100. As a specific example, the packet processing engine 200 may operate according to BPP and hence may act as a BPP engine. Engine 200 includes a parser 231, a command engine 232, a statelet command module 234, a statelet cache manager 235, and a statelet cache 236.

The parser 231 is a component configured to analyze a string of symbols. Specifically, the parser 231 is configured to receive incoming data packets, such as data packets 122, and analyze the data packet header and/or metadata. When the packet processing engine 200 operates on an ingress edge node, the incoming data packets may not contain operational flow profile related data. In such a case the conditional commands to manage the operational flow profile are added by the command engine 232 as discussed below. For example, in such a case the packet processing engine 200 may act as a gateway, and hence attach the BPP blocks with conditional commands to be executed by downstream nodes. Accordingly, the parser 231 reads the data packet header to obtain address information to determine the source, destination, associated flow, etc. When the packet processing engine 200 operates on an interior node or an egress edge node, the data packet header and/or metadata may contain operational flow profile related commands (e.g., inserted into the packet by the ingress edge node). In such a case, the parser 231 reads the data packet header and/or metadata to obtain the operational flow profile related commands in addition to the address/flow information.

The command engine 232 is a component configured to receive parsed data packet information from the parser 231 and manage operational flow profiles for the packet processing engine 200. When the packet processing engine 200 operates on an ingress edge node, the command engine 232 receives the parsed packet information and determines which flow the packet belongs to, for example via a flow key. The command engine 232 then determines which operational flow profiles are associated with the flow, formulates conditional commands to implement and/or manage operational flow profiles, and attaches such conditional commands to the data packet. For example, the command engine 232 may obtain the conditional commands for the operational flow profiles from a system administrator and/or from a user upon initiating the flow. The conditional commands may be received via a controller and/or a remote node initiating the flow. The command engine 232 may then associate such commands with the flow in memory (e.g., in the statelet cache 236 and/or in a flow cache) for attachment to incoming data packets. In such a case, the command engine 232 forwards the packets with the attached operational flow profile data to the forwarder 233 for communication across the network.

When the packet processing engine 200 operates on an interior node and/or an egress node, the command engine 232 is configured to obtain operational flow profile information from the incoming data packet via the parser 231. The operational flow profile information may include conditional commands that initiate, update, export, and/or remove a state of an operational flow profile along with any metadata describing such mechanisms (e.g., describing when and/or how such mechanisms should occur). The command engine 232 may also determine the flow associated with the packet and employ the flow information to obtain corresponding operational flow profile information from the statelet cache manager 235 and/or the statelet cache 236. The command engine 232 employs the operational flow profile information, for example in conjunction with the statelet cache 236, to support measurement and execution. For example, the command engine 232 can employ conditional commands to initialize a state for an operational flow profile in the statelet cache 236 when an operational flow has not already been initialized. Initializing the state for an operational flow profile may include creating buckets (e.g., counter variables) that can be incremented to retain aggregated data. Initializing the state can also include operation commands that indicate the conditions for incrementing the buckets. As another example, the command engine 232 can employ the conditional commands to cause a specified update to the operational flow profile state. As yet another example, the command engine 232 can employ the conditional commands to determine when and how to export the operational flow profile state as well as when and how to remove the operational flow profile state from the statelet cache 236.

The statelet cache manager 235 is a management component configured to assign memory in statelet cache 236, write data to the statelet cache 236, read data from the statelet cache 236, and/or clear memory at the statelet cache 236. The statelet cache 236 is a programmable memory cache that can be configured to store an operational flow profile state and any corresponding data, as well associate such information with a corresponding flow. The statelet cache 236 can be programmed, for example by conditional commands in a data packet, to hold data for an operational flow profile associated with a flow during application of an aggregation function, such as a histogram. For example, the statelet cache 236 may store, update, and retrieve buckets and other data for each flow. The statelet command module 234 is a component configured to control the creation and maintenance of the statelet cache 236 and/or statelet cache manager 235. For example, the statelet command module 234 may create new statelets and/or alter the context of an existing statelet based on commands from the command engine 232.

The forwarder 233 is a communication component configured to transmit data packets to downstream nodes/devices. For example, the forwarder 233 may make routing and/or forwarding decisions for a data packet based on commands from the statelet command module 234 and/or based on address information obtained from the data packet header by the parser 231.

Functionally, the packet processing engine 200 receives data packets at the parser 231, obtains conditional commands from packet metadata at the command engine 232, performs measurements, determines whether conditions are met, and/or performs conditional commands at the statelet command module 234, stores corresponding operational flow profile state data at the statelet cache 236 to support operations at the statelet command module 234, and forwards the data packet downstream at the forwarder 233. When the packet processing engine 200 is located at an ingress edge node or an egress edge node, the packet processing engine 200 may also insert conditional commands or remove conditional commands, respectively, to support management of operational flow profiles via conditional commands by other nodes in the network.

Figure 3:
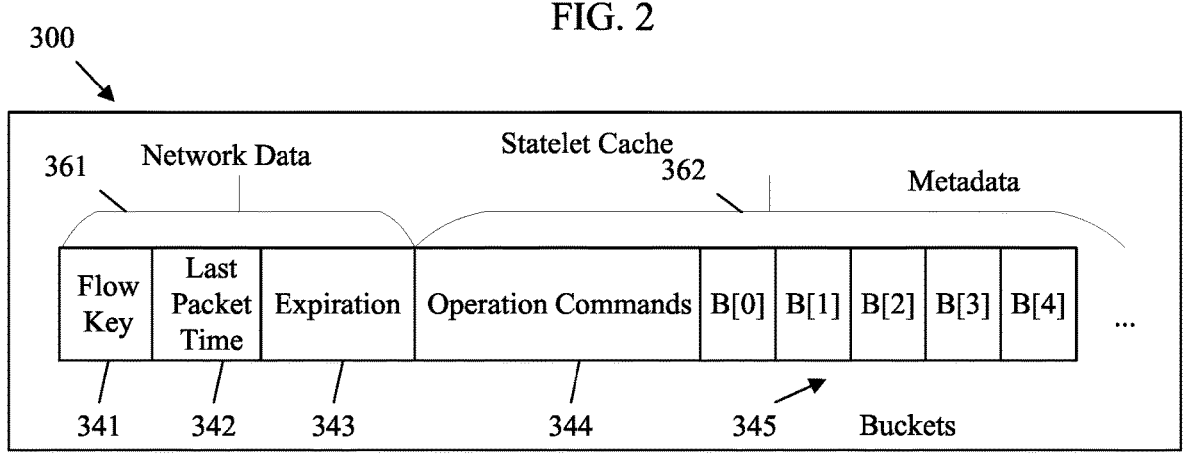
FIG. 3 is a schematic diagram of an example statelet cache for use in implementing an operational flow profile.

FIG. 3 is a schematic diagram of an example statelet cache 300 for use in implementing an operational flow profile, such as operational flow profile 123. For example, a statelet cache 300 may be employed to implement a statelet cache 236 in a packet processing engine 200. Hence, a statelet cache 300 can be employed on a node 111 and/or 112 in network 100. A statelet cache 300 is programmable to store a state of an operational flow profile to support a device, packet, and/or flow related measurements and to support execution of conditional commands. A broad range of measurements and conditional commands can be employed to manage various operational flow profiles. Hence, the statelet cache 300 contains fields that are programmable to store virtually any data desired to support operational flow profile management for data packets and/or corresponding flows. The statelet cache 300 contains network data 361 and programmable metadata 362. The network data 361 is data related to the flow and the statelet. The metadata 362 is data storage that is used for data content specific to the operational flow profile and/or corresponding actions to be taken upon to manage the operational flow profile.

The network data 361 includes a flow key 341 field, which is data that can be employed to match a data packet to a corresponding flow. For example, the flow key 341 may include a combination of packet fields (e.g., a source and a destination), a flow ID, and/or other special marking(s). The network data 361 may also include a last packet time 342 field that includes a timestamp indicating when an immediately preceding packet was received for the flow indicated by the flow key 341. The network data 361 may also contain an expiration 343 field that contains a timer or timestamp. The statelet expires when the timer and/or timestamp contained in the expiration 343 field reaches zero and/or exceeds an expiration threshold. The expiration 343 field timer/timestamp may be set based on an inactivity period, where the inactivity period causes the statelet to expire when no new packet for the flow has been received for a defined time period. Further, statelet cache 300 is included as an example, and additional/different fields may be employed in some examples.

The metadata 362 may contain the state of the operational flow profile at a specified point in time. In the example shown in statelet cache 300, the metadata 362 includes operational commands 344 and buckets 345. The operational commands 344 include commands that indicate conditions and instructions for updating the buckets 345. The buckets 345 contain data including values measured from packet(s) and/or device state(s) and aggregated over time for a corresponding flow.

The following is an example operational flow profile (e.g., operational flow profile 123) that may be implemented by metadata 362 in statelet cache 300. The example operational flow profile is designed to produce a histogram for the distribution of lengths of packets within a corresponding flow. The histogram includes five buckets 345, denoted as B[0], B[1], B[2], B[3], and B[4]. B[0] counts the number of packets in a flow with a length of sixteen octets or less. B[1] counts the number of packets in the flow with a length of greater than sixteen and less than or equal to thirty two octets. B[2] counts the number of packets in the flow with a length of greater than thirty two and less than or equal to one hundred twenty eight octets. B[3] counts the number of packets in the flow with a length of greater than one hundred twenty eight and less than or equal to five hundred twelve octets. B[4] counts the number of packets in the flow with a length of more than five hundred twelve octets. The histogram should be cleared when the flow has been inactive for fifteen seconds or longer. Upon being cleared, the node should export the histogram to a specified collector (e.g., for display to a user/administrator and/or for use as an input to a further automated function).

The abovementioned functionality can be achieved by creating a packet that carries the following commands, which are executed by the node(s) traversed by the packet. If this is the first packet of the flow that is observed, initialize a statelet with the following pieces of information. The packet includes housekeeping information for the statelet including time of time most recent flow packet received (e.g., current time), time to expiration (e.g., fifteen seconds), expiration action=export, and flow key associated with the statelet. The flow key from the packet is stored in the flow key 341, the time of time most recent flow packet received is stored in last packet time 342, and the time to expiration is stored in expiration 343. The export upon expiration action is stored in operation commands 344. The export destination may be configured separately and/or carried in an additional metadata parameter in the packet. The export destination may also be stored in operation commands 344 upon receipt.

The packet also includes statelet histogram metadata indicating five buckets 345 initialized to zero with packet size boundaries for each bucket 345 as described above. The statelet histogram metadata is employed to create and initialize buckets 345. The packet also includes update logic, which applies to all packets in the flow in the present example. In this case, the update logic updates one of the buckets 345 for each packet of the flow based on packet length and bucket boundaries. Expressed as general-purpose pseudo-programming instructions, the command does the following:

Switch (packet_length):
Case 16 (or less): incr(b0); break
Case 32 (or less): incr(b1); break
Case 128 (or less): incr(b2); break
Case 512 (or less): incr(b3); break
Incr(b4)

In the present example, the update logic is received from the packet containing initialization instructions (e.g., a first packet of the flow) and stored in the operation commands. In order to carry the preceding instructions in a header of a programmable packet, more compact instructions are conceivable. For example, in a first variation a command of Statelet.B.update(PL) can be included in a packet. This command invokes a histogram update method on B, where B is an object of type histogram stored in the statelet cache 300. The statelet cache 300 can include self-describing metadata for B including the number of buckets 345 and the bucket 345 boundaries. In a second example variation, a command of Statelet.B.update(PL,16,32,128,512) can be included in a packet. In this case, B is an object of type histogram stored in the statelet cache 300, where the bucket 345 boundaries to apply (and by implication the number of buckets) are provided in the command carried in the packet. In the abovementioned example, the operational commands 344 would include at least the following: Metadata B, Type Histogram, Buckets=5, Bucket Size=2, Boundaries=16, 32, 128, 512. It should be noted the initial packet length may already be known to the sender (e.g., as packet length may not necessarily require assessment across different nodes in the network). However, in case of other data items (such as the interface utilization that was encountered) the sender may not be aware of such data.

Figure 4:
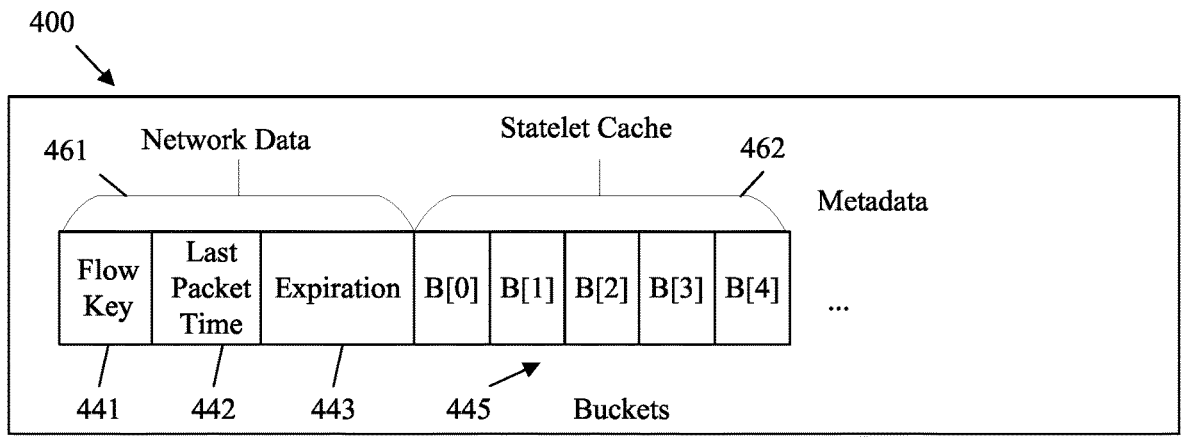
FIG. 4 is a schematic diagram of another example statelet cache for use in implementing an operational flow profile.

FIG. 4 is a schematic diagram of another example statelet cache 400 for use in implementing an operational flow profile, such as operational flow profile 123. For example, a statelet cache 400 may be employed to implement a statelet cache 236 in a packet processing engine 200. Hence, a statelet cache 400 can be employed on a node 111 and/or 112 in network 100. Statelet cache 400 is similar to statelet cache 300. Specifically, statelet cache 400 includes network data 461 including a flow key 441, a last packet time 442, and an expiration 443 and metadata 462 including buckets 445, which are substantially similar to network data 361, flow key 341, last packet time 342, expiration 343, metadata 362, and buckets 345, respectively. The difference is that statelet cache 400 does not include operational commands 344.

Statelet cache 400 is depicted to illustrate that the conditional commands can initialize an operational flow profile by initializing buckets 445 at a statelet cache 400 while omitting from memory some or all of the commands describing how the state should be updated, exported, and/or removed. In this example, the relevant commands for updating the operational flow profile would be included in each packet in the flow. Hence, the internal node can review the conditional commands from each packet and update the buckets 445 accordingly. This may allow different functions to be applied to different packets, for example, by employing different buckets 445 as memory for corresponding functions. Further, the commands to remove and/or export the operational flow profile state can be included in a packet that triggers such functions. Hence, the removing and/or exporting the operational flow profile state can occur on demand. Sub-combinations can also occur, where some operational commands are stored in a statelet cache 300 and/or 400 while others are omitted from memory and contained in relevant packet headers.

Figure 5:
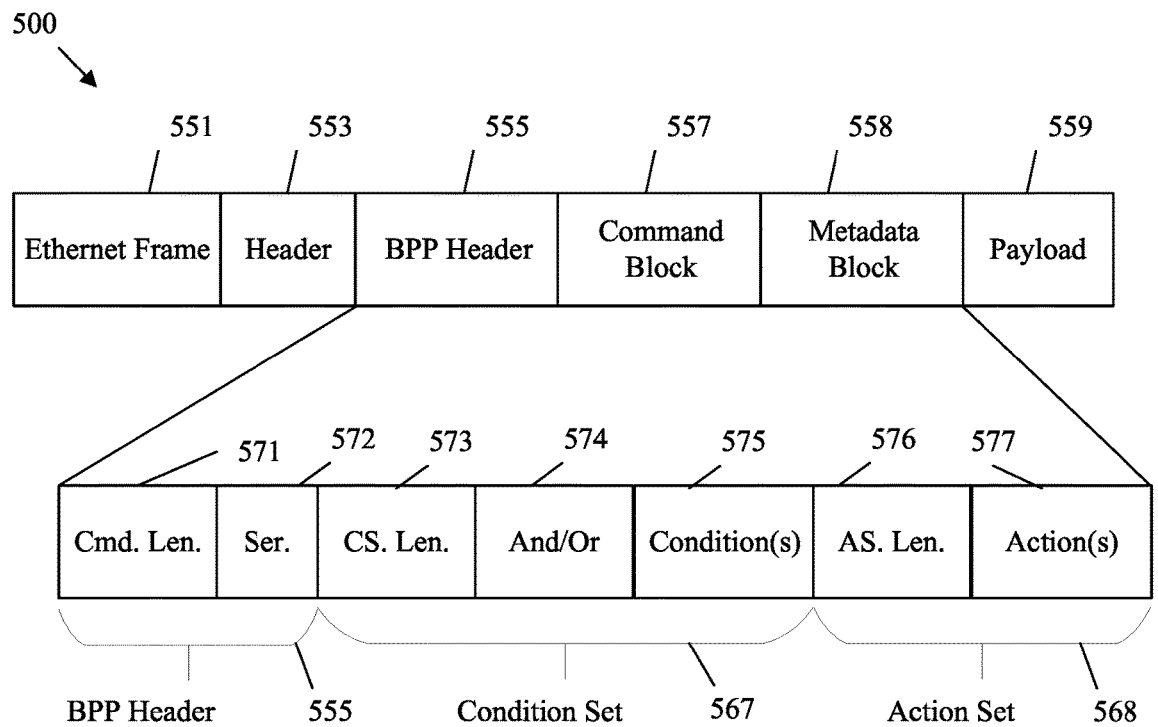
FIG. 5 is a schematic diagram of an example packet that can be employed to manage an operational flow profile.

FIG. 5 is a schematic diagram of an example packet 500 that can be employed to manage an operational flow profile, such as operational flow profile 123. For example, a packet 500 can carry conditional statements sufficient to initialize and/or manage statelet cache 236, 300, and/or 400. Hence, a packet 500 can be employed to initialize a state of an operational flow profile and direct a corresponding node, such as a node 111 and/or 112, to update, export, and/or remove such a state.

An edge node, such as an edge node 111, can receive a communications packet from a remote node, such as remote node 115. The edge node can then add conditional commands to create packet 500. The edge node can then forward packet 500 into the network to manage the operational flow profile(s) operating in node(s) along path(s) of corresponding flow(s). Specifically, the edge node can receive a communications packet including an Ethernet frame 551, a header 553, and a payload 559. The Ethernet frame 551 contains layer two source and destination data for the communications packet, such as media access control (MAC) addresses for the source and destination. The header 553 contains address and other header information for the packet, such as internet protocol (IP) version four (IPv4) and/or version six (IPv6), multi-protocol label switching (MPLS) headers, transport layer headers, etc. The payload 559 is the data communicated from the source to the destination (e.g., in the network). The edge node receives the communications packet and adds additional fields to convert the received communications packet into a packet 500 formatted according to BPP.

Specifically, packet 500 comprises the Ethernet frame 551, the header 553, the payload 559, a BPP header 555, a command block 557, and/or a metadata block 558. The edge node adds the BPP header 555, which indicates that the packet 500 is a BPP packet. The BPP header 555 may also be referred to as a BPP command header. The edge node may also add the command block 557 which may contain one or more conditions that should be satisfied in order to initiate a conditional command. The edge node may also add the metadata block 558 to contain the actions to be taken as part of the conditional command (e.g., upon occurrence of the condition(s)). Hence, the BPP header 555, command block 557, and/or metadata block 558 can be inserted into a packet 500 by an ingress edge node, processed by interior nodes along the path of the flow, and removed by an egress edge node if desired.

The BPP header 555 can include a command length field 571 that indicates the length of the BPP based commands. The BPP header 555 can also include a serial number field 572 that contains a serial number that uniquely identifies the corresponding command.

The command block 557 can contain a condition set 567, which contains the one or more conditions used as part of the conditional command. For example, the condition set 567 in the command block 557 can include a condition set length field 573 that indicates the length of the condition set 567. The condition set 567 can also include a conditions field 575 that includes the one or more conditions that should be satisfied in order to execute the corresponding commands in an action set 568. The condition set 567 can also include an and/or field 574 to indicate whether the conditions in the conditions field 575 are interpreted according to a logical and or a logical or. Specifically, a logical and indicates that all of the conditions in the condition set 567 should be satisfied to initiate the action set 568, while a logical or indicates that any one of the conditions in the condition set 567 can be satisfied to initiate the action set 568.

The metadata block 558 can contain the action set 568, and hence can contain the command portion of the conditional command. The action set 568 can include an action set length field 576, which indicates a length of the action set 568. The action set 568 also includes one or more actions 577, which contain the commands to be executed upon the occurrence of the condition(s) in the condition set 567.

When used to manage operational flow profiles, the condition set 567 can contain data indicating which nodes should execute the action set 568. Accordingly, the condition set 567 can be employed to select the node or nodes that should contain the operational flow profile. Further, the condition set 567 can contain data indicating the circumstances that should trigger changes in the execution of the operational flow profile. For example, the condition set 567 can be set to indicate the circumstances that should be present to cause the operational flow profile state to be initiated, updated, exported, and/or removed. Meanwhile, the action set 568 can contain the actions to be taken upon occurrence of the corresponding condition(s). For example, the action set 568 can contain instructions for initializing, updating, exporting, and/or removing an operational flow profile state. It should be noted that different actions may be triggered by different conditions. Accordingly, the functionality of the operational flow profile can be set up by using multiple packets 500 containing different condition sets 567 and different action sets 568. It should also be noted that the condition sets 567 and action sets 568 may have no effect on the routing of the packet 500 and also may have no direct effect on the payload 559. The conditional commands encoded in the condition sets 567 and action sets 568 may simply use the payload 559 and supporting packet 500 structures to route the conditional command(s) to the relevant node(s) that manage the flow associated with the payload 559. As such, the conditional command(s) may operate on the flow without direct knowledge of the payload 559 being communicated.

Figure 6:
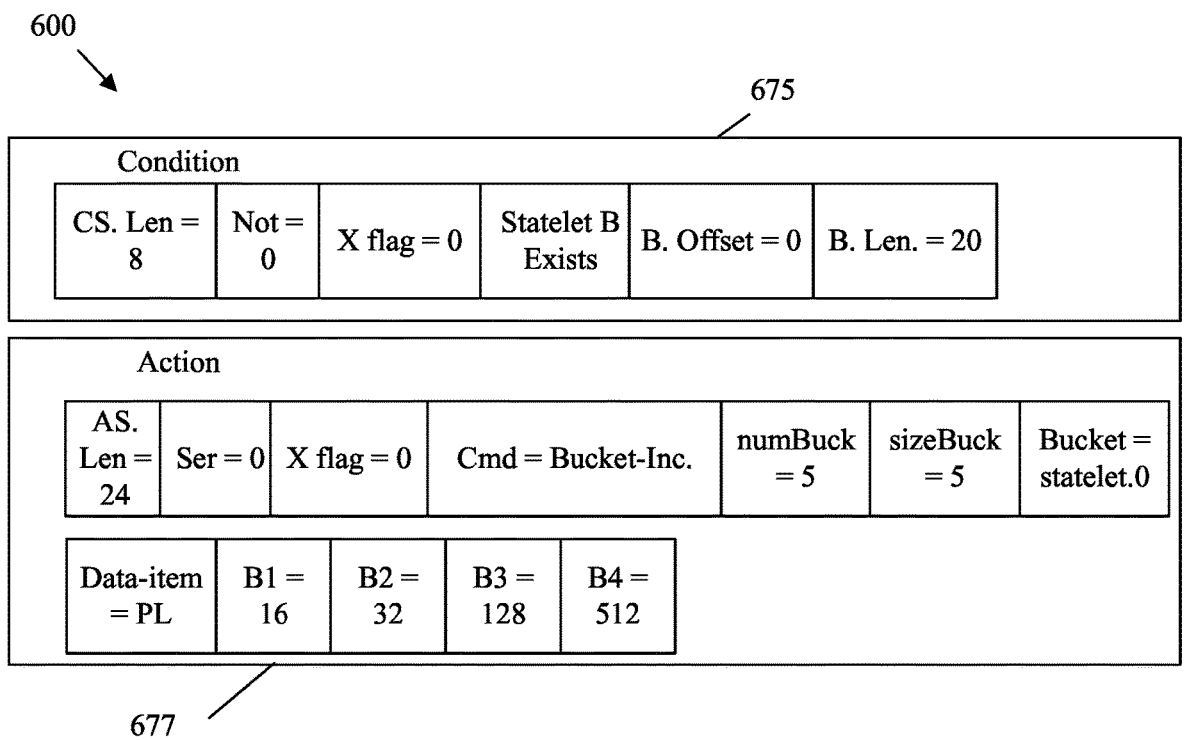
FIG. 6 is a schematic diagram of an example conditional commands that can be employed to initialize an operational flow profile.

FIG. 6 is a schematic diagram of an example conditional commands 600 that can be employed to initialize an operational flow profile, such as operational flow profile 123. For example, conditional commands 600 can be transmitted as part of a packet 500 in order to initialize and/or manage statelet cache 236, 300, and/or 400. Hence, conditional commands 600 can be employed to initialize a state of an operational flow profile and direct a corresponding node, such as a node 111 and/or 112, to update, export, and/or remove such a state.

The conditional commands 600 contain an example block of conditions 675 and an example block of actions 677 that may implement a specific example of a condition set 567 and an action set 568, respectively. The conditional commands 600 shown initialize a statelet B to act as an operational flow profile. Specifically, the conditional commands 600 initialize a statelet B when a statelet B for the flow does not already exist. Accordingly, the conditional commands 600 could be employed on a first packet in a flow to create an operational flow profile to perform aggregation function(s) on additional flow packets.

The conditions 675 check to determine whether the statelet B already exists. If so, a new statelet is not created. Specifically, the conditions 675 contains a statelet B exists condition and a not flag set to zero indicating the statelet B exists condition should be interpreted as a negative. Taken together, the conditions 675 are satisfied when a statelet B does not exist at a receiving node. The conditions 675 also contain condition set (CS) length data set to eight octets to indicate the length of the condition set. The conditions 675 also contain an offset and a length for statelet B of zero and twenty octets, respectively. The conditions 675 may also contain an x flag set to zero, which could be altered to modify the conditions 675.

The actions 677 are executed when the conditions 675 are met. In this case when a statelet B does not exist at a node receiving the conditional commands 600, the actions 677 create a statelet B. The actions 677 contain an action set (AS) length of twenty octets that indicates the length of the actions 677. The actions 677 also contain a serial number set to zero to indicate this is the first conditional command 600 for the corresponding flow. The actions 677 also contain an X flag set to zero. The actions 677 contain a command to create incrementing buckets. The actions 677 then set the number of buckets to five and the size of the buckets (e.g., the amount of memory allocated to each bucket) to five octets. The actions 677 then set the first bucket, denoted as B0 to the first memory position in statelet B. The actions 677 then provide a name PL for the group of buckets. The name PL can later be invoked by update commands to update the buckets (e.g., commands Statelet.B.update(PL), Statelet.B.update(PL,16,32,128,512), etc.) The actions 677 then provide lower boundaries for the buckets B1, B2, B3, and B4 of greater than sixteen octets, greater than thirty two octets, greater than one hundred twenty eight octets, and greater than five hundred twelve octets, respectively. The lower boundary of B1 allows the upper boundary of B0 to be inferred as less than or equal to sixteen octets. As such, the actions 677 can create a statelet B in order to implement statelet cache 400 when such a statelet does not already exist according to conditions 675. Actions 677 could also be employed to create a statelet cache 300 by further including update instructions as operation commands 344. It should be noted that conditional commands 600 are included to illustrate a specific example of a command to create an operational flow profile. One skilled in the art will understand that conditional commands 600 can be modified to include a broad range of conditions and commands in order to create a broad range of operational flow profiles based on desired utility. Further, such commands can be generated simply by a network administrator with ordinary programming skill in order to create functionality desired to address specific problems and/or issues as such arise during operation of a data center.

Figure 7:
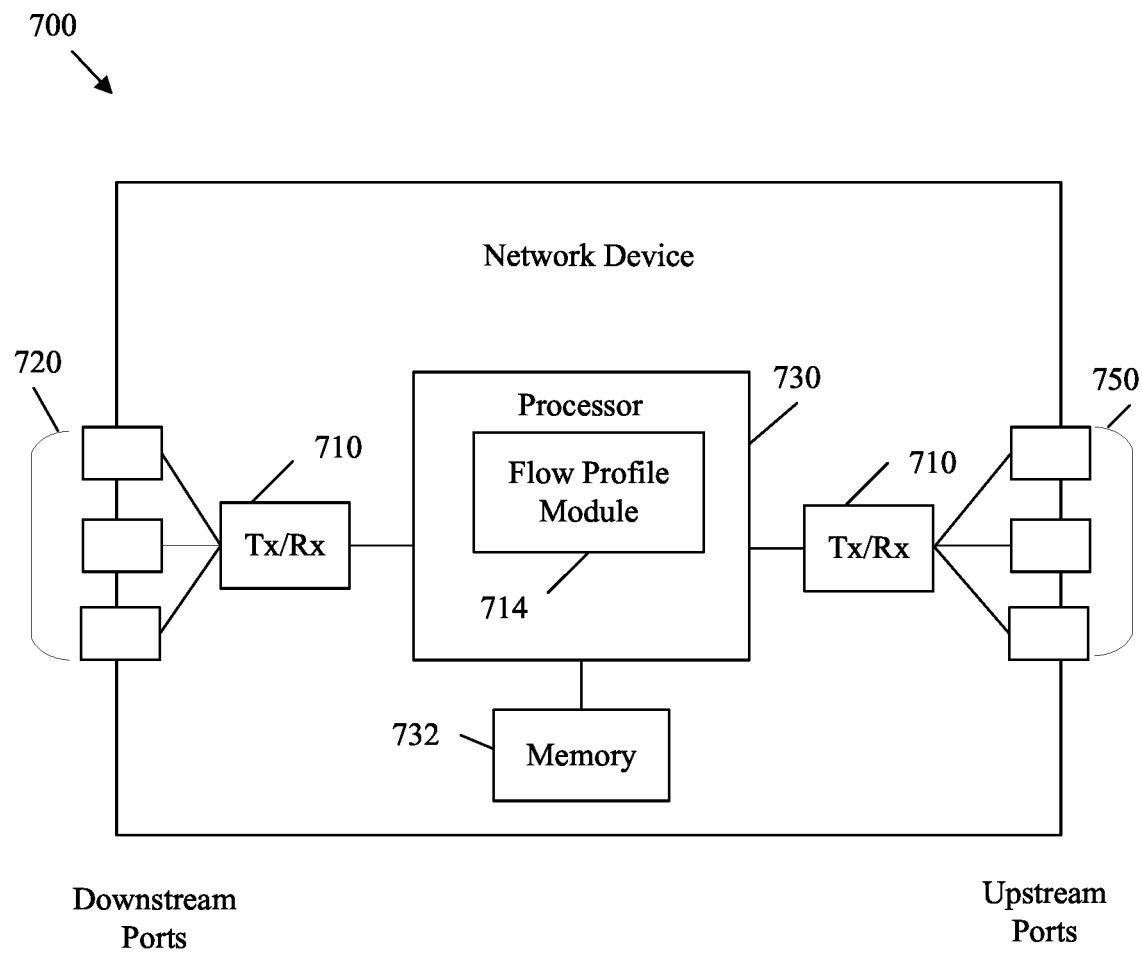
FIG. 7 is a schematic diagram of an example network device for managing an operational flow profile.

FIG. 7 is a schematic diagram of an example network device 700 for managing an operational flow profile, such as operational flow profile 123. For example network device 700 may interact with network packets, such as data packets 122 as part of a data flow 121. As a further example, network device 700 may implement an edge node 111, an internal node 112, and/or a controller 113 in a network domain 110. Further, the network device 700 can be configured to create and/or execute conditional commands 600 as part of a packet 500 in order to initialize and/or manage a statelet cache 236, 300, and/or 400. In addition, network device 700 can be employed to a packet processing engine 200. Also, network device 700 can be employed to implement method 800 and/or 900 as well as other methods/mechanisms disclosed herein.

Accordingly, the network device 700 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 700 is merely an example. Network device 700 is included for purposes of clarity of discussion, but is in no way meant to limit the application of the present disclosure to a particular network device embodiment or class of network device embodiments.

The network device 700 may be a device that communicates electrical and/or optical signals through a network, e.g., a switch, router, bridge, gateway, etc. In some cases, the network device 700 may act alone, or in concert with other network devices 700 to operate a virtual network device with the functionality described herein. As shown in FIG. 7, the network device 700 may comprise transceivers (Tx/Rx) 710, which may be transmitters, receivers, or combinations thereof. A Tx/Rx 710 may be coupled to a plurality of downstream ports 720 (e.g., downstream interfaces) for transmitting and/or receiving frames from other nodes and a Tx/Rx 710 coupled to a plurality of upstream ports 750 (e.g., upstream interfaces) for transmitting and/or receiving frames from other nodes, respectively. A processor 730 may be coupled to the Tx/Rxs 710 to process the data signals and/or determine which nodes to send data signals to. The processor 730 may comprise one or more multi-core processors and/or memory devices 732, which may function as data stores, buffers, etc. For example, the memory devices 732 can contain statelet caches for use as operational flow profiles. Processor 730 may be implemented as a general processor or may be part of one or more application specific integrated circuits (ASICs) and/or digital signal processors (DSPs). The network device 700 may comprise a flow profile module 714, which may be configured to initialize, update, export, and/or remove operational flow profiles as well as generate and/or execute conditional commands related to such operational flow profiles, depending on the example. The flow profile module 714 may be implemented in a general purpose processor, a field programmable gate array (FPGA), an ASIC, a DSP, a microcontroller, etc. In alternative embodiments, the flow profile module 714 may be implemented in processor 730 as computer executable instructions stored in memory device 732 (e.g., as a computer program product stored in a non-transitory computer readable medium), which may be executed by processor 730, and/or implemented in part in the processor 730 and in part in the memory device 732. The downstream ports 720 and/or upstream ports 750 may contain wireless, electrical, and/or optical transmitting and/or receiving components, depending on the embodiment.

Figure 8:
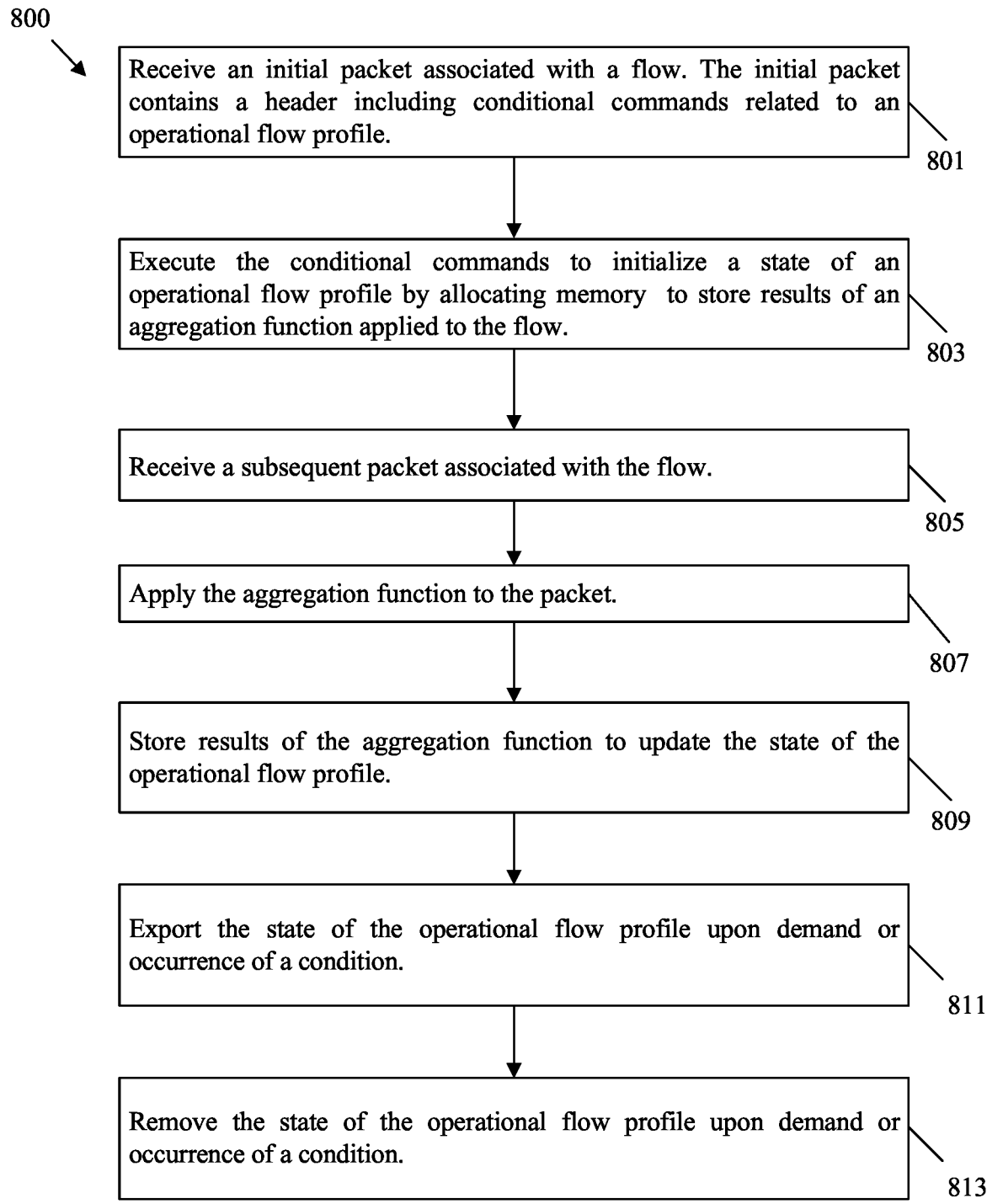
FIG. 8 is a flowchart of an example method for managing an operational flow profile at a network node positioned along a path of a flow.

FIG. 8 is a flowchart of an example method 800 for managing an operational flow profile, such as operational flow profile 123, at a network node positioned along a path of a flow, such as an internal node 112. Method 800 may operate on a packet processing engine 200 configured to receive packets, such as packet 500, containing conditional commands, such as conditional commands 600. Further, method 800 may create and employ a statelet cache, such as statelet cache 300 and/or 400 to apply an aggregation function to a flow, such as flow 121. Further, method 800 may operate on a network element (NE) such as a network device 700.

Method 800 initiates upon receiving an initial packet associated with a flow at step 801. The initial packet contains a header including conditional commands related to an operational flow profile. The NE can read the conditional commands and determine whether the condition(s) are satisfied. If the condition(s) are not satisfied, the NE may forward the packet and may not proceed further. If the condition(s) are satisfied, the NE may proceed to step 803.

At step 803, the NE may execute the conditional commands (e.g., the action set of the conditional commands) to initialize a state of an operational flow profile. Initializing an operational flow profile state may include allocating memory of the NE to store results of an aggregation function to be applied to the flow. In some examples, allocating memory includes creating a statelet to manage the operational flow profile as discussed above. In other examples, allocating memory may include a general allocation of cache memory. The NE may forward the initial packet. Specifically, method 800 may be designed to forward packets regardless of the operation of the operational flow profile(s) in order to make the functionality of the operational flow profile(s) transparent to the underlying data flow.

At step 805, a subsequent packet associated with the flow is received. The NE may then apply the aggregation function to the packet at step 807. As non-limiting examples, the aggregation function may measure packet data, flow telemetry, NE hardware statistics, NE hardware telemetry, or combinations thereof. As further non-limiting examples, the aggregation function may be a histogram, a max function, a top-n function, a mean function, etc. At step 809, the NE may store results of the aggregation function in the allocated memory to update the state of the operational flow profile.

As discussed above, the instructions to apply the aggregation function and update the operational flow profile state according to steps 807 and 809 may be received by multiple mechanisms. In one example, the conditional commands in the initial packet received at step 801 may include commands that specify operations to update the state of the operational flow profile. This information is provided in order to implement the aggregation function. In such a case the commands that specify operations to update the state of the operational flow profile are stored in the memory as part of step 803. In another example, each packet of the flow may include conditional commands that specify operations to update the state of the operational flow profile in order to implement the aggregation function. In such a case, the operations to update the state of the operational flow profile are not stored in the memory. Specifically, such conditional commands that specify the update operations are read and executed upon the receipt of each packet, for example at steps 805, 807, and 809.

Many packets in a flow may be received and processed, for example by repeating steps 805, 807, and 809 for each subsequent packet. At step 811 the state of the operational flow profile is exported. This may occur upon demand or upon occurrence of a condition. As discussed above, the instructions to export the operational flow profile state according to step 811 may be received by multiple mechanisms. In one example, the conditional commands in the initial packet received at step 801 may include commands that specify operations to export the state of the operational flow profile. In such a case, the commands that specify operations to export the state of the operational flow profile are stored in the memory as part of step 803. Exporting the state of the operational flow profile at step 811 is then initiated upon the occurrence of predefined event, such as the expiration of a statelet due to defined time without further flow packets (e.g., indicating the flow has expired and aggregation is complete). In another example, at least one packet of the flow (e.g., the last packet) includes conditional commands that specify operations to export the state of the operational flow profile. In such a case, the operations to export the state of the operational flow profile are not stored in the memory. Specifically, the packet containing the export commands may cause the operational flow profile to be exported upon receipt of the corresponding packet. This allows a network administrator to trigger an export on demand.

At step 813, the state of the operational flow profile is exported. This may occur upon demand or upon occurrence of a condition. As discussed above, the instructions to remove the operational flow profile state according to step 813 may be received by multiple mechanisms. In one example, conditional commands in the initial packet received at step 801 or any subsequent packet may include commands that specify a policy describing a mechanism to remove the state of the operational flow profile (e.g., describing when and how the state should be removed). In such a case, the policy and/or mechanism are stored in the memory as part of step 803. Removing the state of the operational flow profile at step 813 is then initiated upon the occurrence of a predefined event, such as the expiration of a statelet due to defined time without further flow packets (e.g., indicating the flow has expired and aggregation is complete). In another example, at least one packet of the flow (e.g., the last packet) includes conditional commands that specify operations to remove the state of the operational flow profile. In such a case, the operations to remove the state of the operational flow profile are not stored in the memory. Specifically, the packet containing the removal commands may cause the operational flow profile to be removed upon receipt of the corresponding packet. This allows a network administrator to trigger a removal of the operational flow profile on demand. It should be noted that removal and export of the operational flow profile state may be linked in some examples. For example, exporting and removing the operational flow profile state may be initiated as part of related commands.

It should be noted that any of the packets of the flow described above may include conditional commands that indicate the operational flow profile is applicable to one or more specified nodes in a network along a path of the flow. For example, node(s) can be specified as part of the conditions for the conditional commands described above. This allows a network administrator to specify the node(s) that will apply the operational flow profile, and hence specify the node(s) that operate method 800. In such a case, node(s) that are not specified in the conditions would consider the conditions to be unmet and would not execute the corresponding commands. This may allow a network administrator to have single or small subset of nodes to perform such functions. In other examples, a network administrator could apply different operational flow profiles, and hence different aggregation functions, at different specified nodes.

Figure 9:
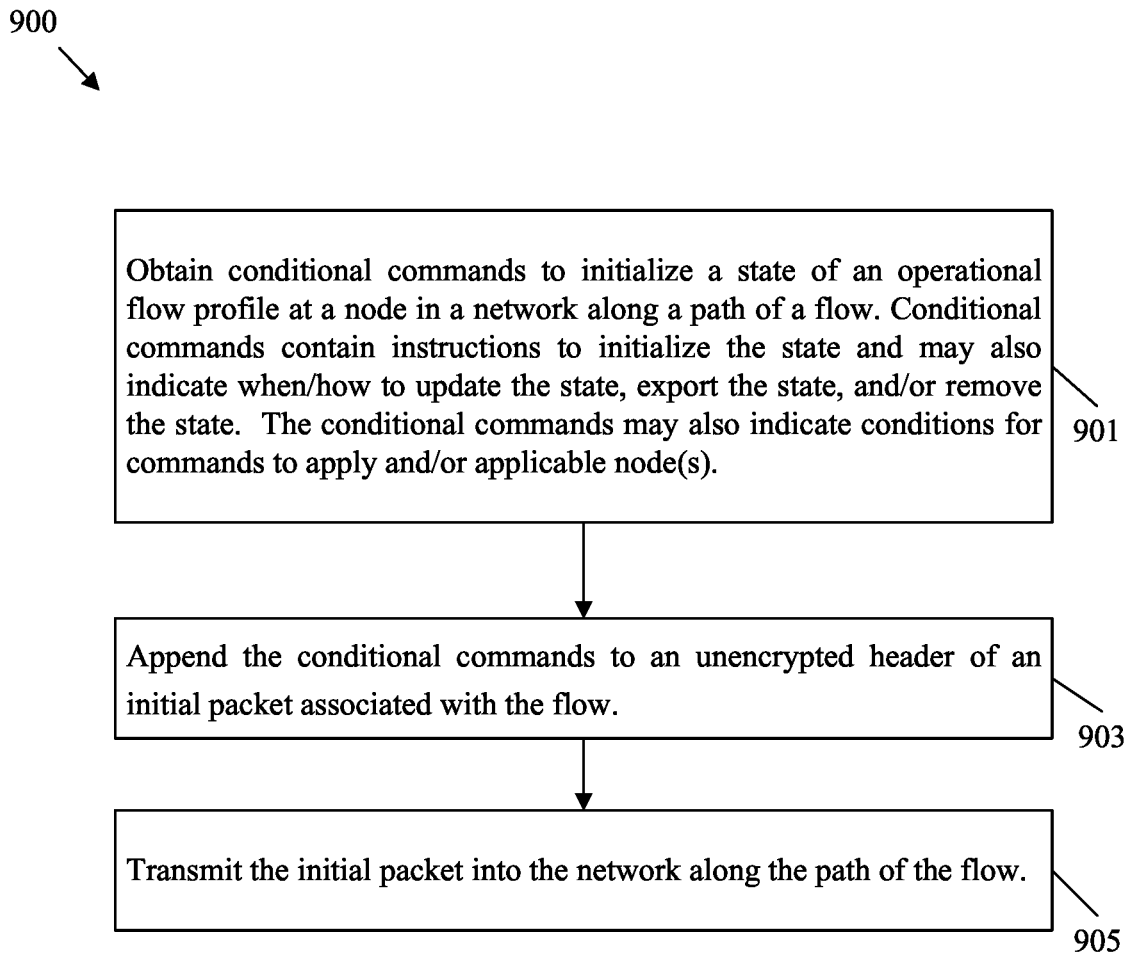
FIG. 9 is a flowchart of an example method for managing an operational flow profile from a network node positioned at a network edge.

FIG. 9 is a flowchart of an example method 900 for managing an operational flow profile, such as operational flow profile 123, from a network node positioned at a network edge, such as an edge node 111. Method 900 may operate on a packet processing engine 200 configured to generate and transmit packets, such as packet 500, containing conditional commands, such as conditional commands 600. Further, method 900 may be employed to direct the creation and management of a statelet cache, such as statelet cache 300 and/or 400 to apply an aggregation function to a flow, such as flow 121. Further, method 900 may operate on a network element (NE) such as a network device 700. In addition, method 900 may be employed to create the conditional commands that are received and used by method 800.

Method 900 initiates upon obtaining conditional commands to initialize a state of an operational flow profile in memory at a node in a network along a path of a flow at step 901. For example, the conditional commands may be received from a network administrator and/or from an automated network control system, such as a controller 113. The conditional commands may be generated as output from other functions. Further, the results of the operational flow profile (e.g., the results of method 800) may be employed as input to other functions. As discussed above, the operational flow profile is initialized to store results of an aggregation function applied to the flow. The conditional commands may also indicate when/how to update the state, export the state, and/or remove the state of the operational flow profile (e.g., a policy). The conditional commands may also indicate conditions for commands to apply and/or applicable node(s). For example, the aggregation function may be a histogram, a max function, a top-n function, a mean function, etc. Further, the aggregation function may measure packet data, flow telemetry, NE hardware statistics, NE hardware telemetry, or combinations thereof.

At step 903, at least some of the conditional commands are appended to an unencrypted header of an initial packet associated with the flow. The initial packet can then be transmitted into the network along the path of the flow at step 905. Additional conditional commands can be forwarded on subsequent packets (e.g., second packet, third packet, etc.)

As discussed above, the conditional commands can be implemented in various ways to create a wide range of functionality. In one example, the conditional commands in the initial packet include commands that specify operations to update the state of the operational flow profile in order to implement the aggregation function. Such conditional commands direct the node to store the commands that specify operations to update the state of the operational flow profile in memory at the node.

In another example, conditional commands can be appended at step 903 (for the initial and subsequent packets) that specify operations to update the state of the operational flow profile. Such commands can be appended to the header for each packet of the flow in order to implement the aggregation function. In such case, the conditional commands do not direct the node to store operations to update the state of the operational flow profile in memory at the node.

In another example, the conditional commands in the initial packet include commands that specify operations to remove the state of the operational flow profile. The conditional commands may direct the node to store the commands that specify operations to remove the state of the operational flow profile in memory at the node. In another example, conditional commands can be appended at step 903 (for the initial and subsequent packets) that specify operations to remove the state of the operational flow profile. In such a case, the conditional commands do not direct the node to store the operations to remove the state of the operational flow profile in memory at the node.

In another example, the conditional commands in the initial packet include commands that specify operations to export the state of the operational flow profile. The conditional commands directing the node to store the commands that specify operations to export the state of the operational flow profile in memory at the node. In another example, conditional commands can be appended at step 903 (for the initial and subsequent packets) that specify operations to export the state of the operational flow profile. In such a case, the conditional commands do not direct the node to store the operations to export the state of the operational flow profile in memory at the node.

In another example, the conditional commands are appended to at least one packet of the flow, as discussed above, along with indication(s) that the operational flow profile is applicable to one or more specified nodes in the network along the path of the flow. This allows the network administrator to indicate that specific node(s) should apply specific aggregation function(s) and that un-specified nodes should be excluded for managing the operational flow profile.

The following graphs 1000-1400 depict various examples of results that may be produced by an operational flow profile, and suggests how such results might be used. It should be noted that the graphs 1100, 1200, 1300, and 1400 are purely examples and that such graphs may vary depending on the operational flow profile configuration as well as the conditions in the network and the flow involved.

Figure 10:
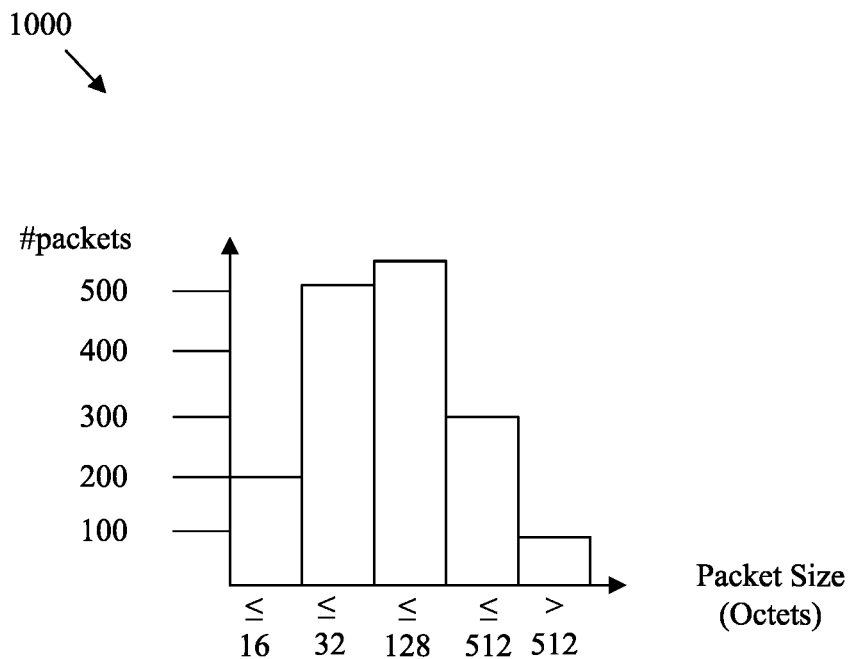
FIG. 10 is a graph of example output obtained by an operational flow profile.

FIG. 10 is a graph 1000 of example output obtained by an operational flow profile, such as operational flow profile 123. Graph 1000 depicts an example output histogram created by an operation flow profile as described above, for example in reference to FIG. 3. As shown, the operational flow profile 123 is applied to classify the packets in a flow according to size. The aggregation function increments a bucket for each packet in the flow based on the size of the corresponding packet. In the example shown, about two hundred packets were received with a size of sixteen octets or less, about five hundred packets were received with a size of between thirty two octets or and sixteen octets, about five hundred fifty packets were received with a size of between one hundred twenty eight octets and thirty two octets, about three hundred packets were received with a size of between five hundred twelve octets and one hundred twenty eight octets, and about one hundred packets were received with a size in excess of five hundred twelve octets. This sort of histogram can be used to determine a profile for a flow, for example to support resource provisioning.

Figure 11:
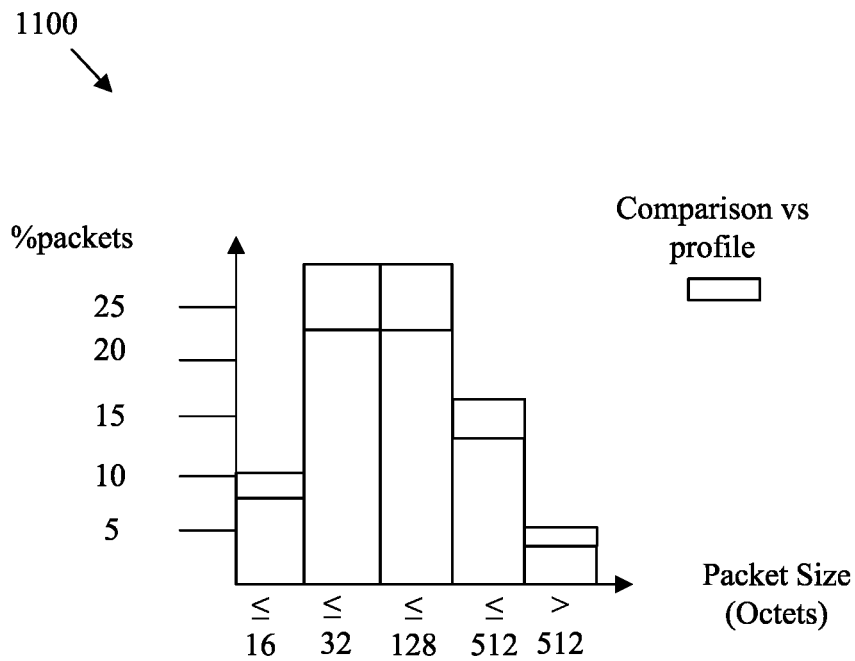
FIG. 11 is another graph of example output obtained by an operational flow profile.

FIG. 11 is another graph 1100 of example output obtained by an operational flow profile, such as operational flow profile 123. Graph 1100 is similar to graph 1000 with the added functionality that the histogram of the flow, depicted as white blocks, is compared to a histogram of a known profile, depicted as shaded blocks. For example, the known profile may be the profile for a flow affected by a malicious program such as a worm or other malware. By comparing the profiles, the network administrator can determine whether a flow of encrypted data is likely compromised by malicious software without decrypting or otherwise snooping into the underlying data. Hence, malware can be detected without violating the privacy of the user's associated with the flow.

Figure 12:
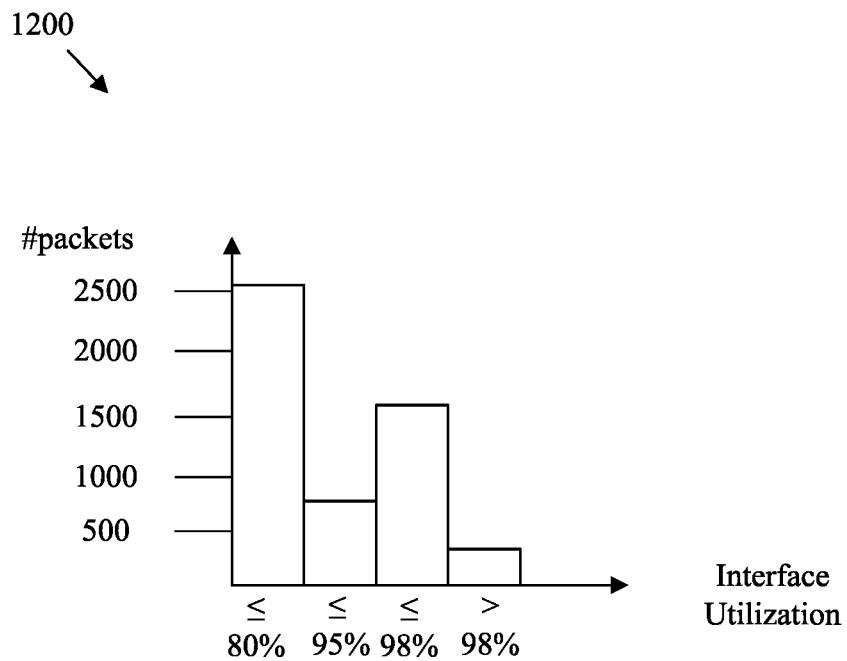
FIG. 12 is another graph of example output obtained by an operational flow profile.

FIG. 12 is another graph 1200 of example output obtained by an operational flow profile, such as operational flow profile 123. Graph 1200 depicts interface utilization for the packets of a flow. In the example, about two thousand five hundred packets experienced less than or equal to eighty percent interface utilization, about seven hundred packets experienced between eighty percent and ninety five percent interface utilization, about one thousand five hundred packets experienced between ninety five and ninety eight percent interface utilization, and about three hundred packets experienced greater than ninety eight percent interface utilization. This graph 1200 could be employed to diagnose reasons behind packet drops for a particular flow. When interface utilization is consistently high, the packet drops could be caused by overloaded interfaces. The network may then add more interface equipment, reroute some or all of the flow, and/or change resource allocations to address the issue and restore beneficial service to the flow.

Figure 13:
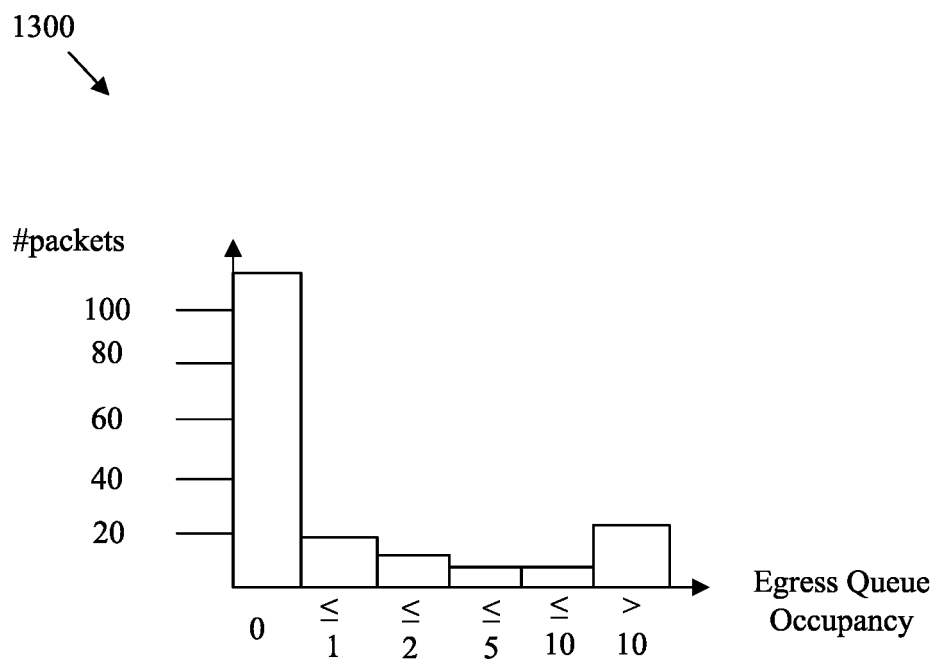
FIG. 13 is another graph of example output obtained by an operational flow profile.

FIG. 13 is another graph 1300 of example output obtained by an operational flow profile, such as operational flow profile 123. Graph 1300 depicts egress queue occupancy for the packets in the flow, where queue occupancy is measured by the number of packets already in queue for transmission when a corresponding packet is received. In this example, about one hundred twenty packets experience zero queue occupancy (e.g., an empty queue), about twenty packets experience a queue occupancy of one, about fifteen packets experience a queue occupancy of two, about ten packets experience a queue occupancy of between two and five, about ten packets experience a queue occupancy of between five and ten, and about twenty five packets experience a queue occupancy of greater than ten. This sort of graph 1300 could be employed to diagnose jitter and other insufficient resource reservations in a high-precision network. For example, a high queue occupancy may delay packets causing latency between packets (e.g., jitter). This sort of graph 1300, if generated at multiple nodes, could determine the source of the jitter so resource reservations and/or routing can be altered to address the jitter issue.

Figure 14:
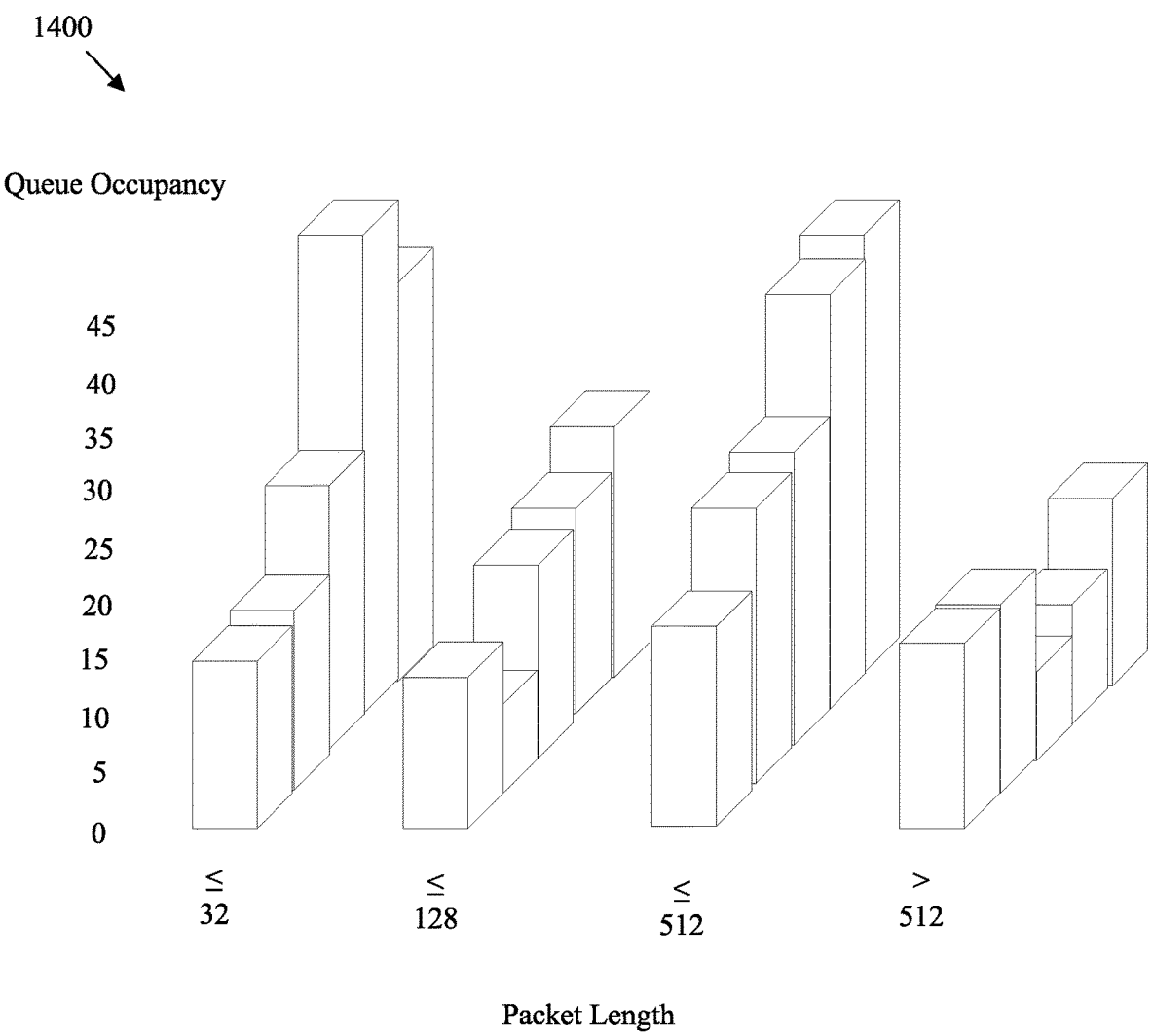
FIG. 14 is another graph of example output obtained by an operational flow profile.

FIG. 14 is another graph 1400 of example output obtained by an operational flow profile, such as operational flow profile 123. Graph 1400 depicts an example of a multi-dimensional operational flow profile that considered multiple variables per packet. Specifically, the graph 1400 depicts the number of packets that the experience corresponding queue occupancy as sorted by packet length in octets. Graph 1400 is depicted to note that complex multi-dimensional comparisons can be made using the operational flow profiles configured according to the conditional commands described herein.

Some other items are relevant to the disclosed examples. It should be noted that error handling may occur via BPP procedures, the specifics of which may be outside the scope of this disclosure. In BPP, errors may be indicated in a packet via a flag, so the fact that an error occurred can be detected by downstream nodes. In addition, the fact that an error occurred can also be recorded inside the statelet, with the profile marked accordingly. In order to avoid a performance penalty at the forwarding device, the conditional commands can be categorized as non-blocking in BPP, allowing execution to be applied separately from packet forwarding. The command can be conditional on the node being of a certain category, such as an edge node, a statelet exporter node, and/or even a specific node. Exporting of profile data can be triggered via an explicit command sent via a packet, or exporting can be triggered by another condition such as time, which can be specified with the initial set of commands that set up the profile. Export mechanisms can include carrying the profile data as metadata in a BPP packet, which can be stripped off and/or exported by an application on the egress edge, or such mechanisms can include instructions to export directly from the node via a separate push mechanism.

Figure 15:
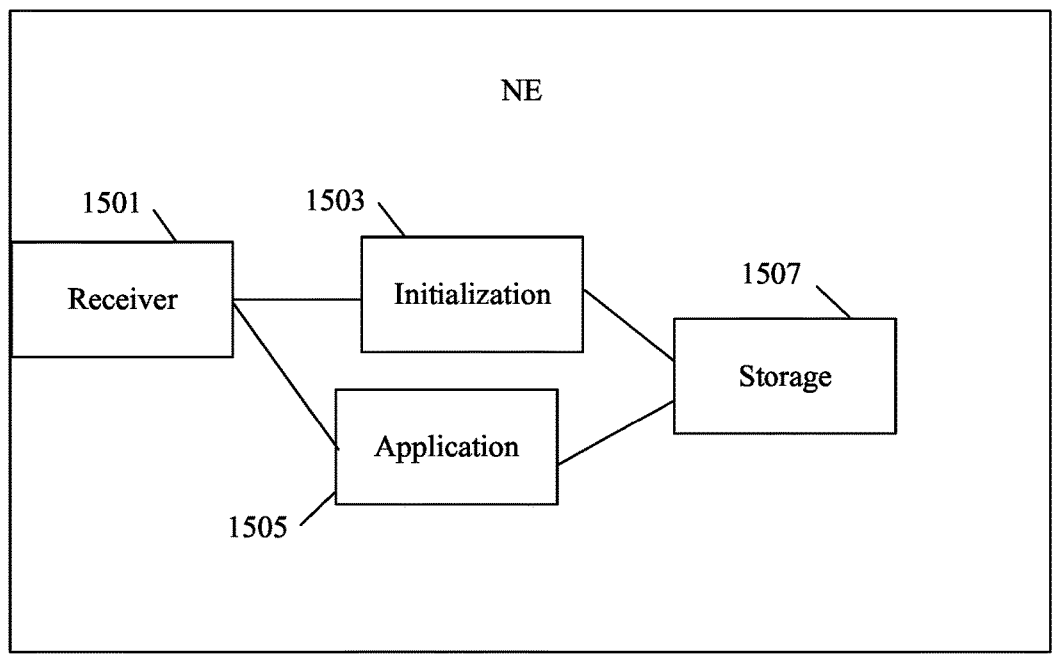
FIG. 15 is a schematic diagram of an embodiment of a network element (NE) for managing an operational flow profile.

FIG. 15 is a schematic diagram of an embodiment of a NE 1500 for managing an operational flow profile. The NE 1500 includes a receiving module 1501 for receiving an initial packet associated with a flow and a subsequent packet associated with the flow, the initial packet containing a header including conditional commands related to an operational flow profile. The NE 1500 further comprises an initialization module 1503 for executing the conditional commands to initialize a state of an operational flow profile by allocating memory of the NE 1500 to store results of an aggregation function applied to the flow. The NE 1500 further comprises an application module 1505 for applying the aggregation function to the packet. The NE 1500 further comprises a storage module 1507 for storing results of the aggregation function to update the state of the operational flow profile.

Figure 16:
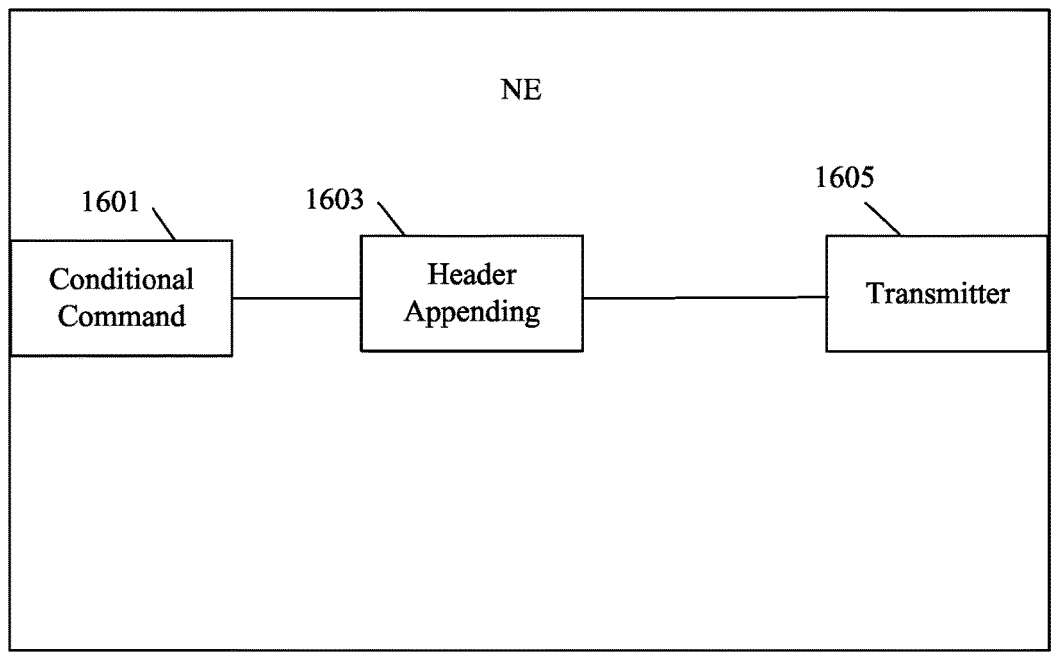
FIG. 16 is a schematic diagram of another embodiment of a NE for managing an operational flow profile.

FIG. 16 is a schematic diagram of another embodiment of a NE 1600 for managing an operational flow profile. The NE 1600 includes a conditional command module 1601 for obtaining conditional commands (as inserted/appended by a sender) to initialize a state of an operational flow profile in memory at a node in a network along a path of a flow, the operational flow profile initialized to store results of an aggregation function applied to the flow. The NE 1600 further comprises a header appending module 1603 for appending the conditional commands to an unencrypted header of an initial packet associated with the flow. The NE 1600 further comprises a transmitting module 1605 for transmitting the initial packet into the network along the path of the flow.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE), the method comprising:
    receiving, by a receiver of the NE, an initial flow packet associated with a flow, the initial flow packet containing a header including one or more conditional commands, the conditional commands including a condition and a command, the condition indicating an item to be satisfied as a prerequisite to execution of the command, and the command initiating creation of an operational flow profile upon occurrence of the condition;
    executing, by a processor at the NE, the conditional commands to initialize a state of the operational flow profile, the initialization including allocating a statelet in a memory of the NE to store results of an aggregation function applied to a subsequent flow packet of the flow based on the conditional commands from the initial flow packet;
    receiving, by the receiver, the subsequent flow packet associated with the flow;
    applying, by the processor, the aggregation function to the subsequent flow packet; and
    storing, in the memory, results of the aggregation function to the subsequent flow packet to update the state of the operational flow profile,
    wherein at least one flow packet of the flow includes the conditional commands including at least one command that specifies operations to update the state of the operational flow profile to implement the aggregation function, the method further comprising storing the commands that specify operations to update the state of the operational flow profile in the memory, and
    wherein at least one flow packet of the flow includes a policy describing a mechanism to remove the state of the operational flow profile, the method further comprising storing in the memory the policy to remove the state of the operational flow profile.

2. The method of claim 1, wherein a plurality of flow packets of the flow includes conditional commands that specify operations to update the state of the operational flow profile to implement the aggregation function, the operations to update the state of the operational flow profile being stored elsewhere than in the memory.

3. The method of claim 1, wherein at least one flow packet of the flow includes a conditional command specifying operations to remove the state of the operational flow profile, the operations to remove the state of the operational flow profile being stored elsewhere than in the memory.

4. The method of claim 1, wherein at least one flow packet of the flow includes a command specifying operations to export the state of the operational flow profile, the method further comprising storing in the memory the commands that specify operations to export the state of the operational flow profile.

5. The method of claim 1, wherein at least one flow packet of the flow includes a conditional command specifying operations to export the state of the operational flow profile, the operations to export the state of the operational flow profile being stored elsewhere than in the memory.

6. The method of claim 1, wherein at least one flow packet of the flow includes a conditional command indicating the operational flow profile is applicable to one or more nodes in a network along a path of the flow.

7. The method of claim 1, wherein the aggregation function includes matching a target data item against a bucket criterion, updating a set of counters representing buckets in a histogram based on the bucket criterion, and generating the histogram based on the set of counters.

8. The method of claim 1, wherein the aggregation function measures at least one of packet data, flow telemetry, NE hardware statistics, NE hardware telemetry, or any combination thereof.

9. A method implemented by a network element (NE), the method comprising:
    obtaining, by a processor of the NE, one or more conditional commands, conditional commands including a condition and a command, the condition indicating an item to be satisfied as a prerequisite to execution of the command, and the command initiating creation of an operational flow profile upon occurrence of the condition, the initialization including allocating a statelet in memory at a node in a network along a path of a flow, the state of the operational flow profile initialized to store results of an aggregation function applied to a subsequent flow packet of the flow based on the conditional commands from an initial flow packet;

appending, by the processor, the conditional commands to an unencrypted header of the initial flow packet associated with the flow; and transmitting, by a transmitter of the NE, the initial flow packet into the network along the path of the flow, wherein at least one flow packet of the flow includes the conditional commands including at least one command that specifies operations to update the state of the operational flow profile to implement the aggregation function, the conditional commands directing the node to store the commands that specify operations to update the state of the operational flow profile in the memory at the node, and wherein at least one flow packet of the flow includes a policy describing a mechanism to remove the state of the operational flow profile, the method further comprising storing in the memory the policy to remove the state of the operational flow profile.

10. The method of claim 9, further comprising appending conditional commands that specify operations to update the state of the operational flow profile in a plurality of flow packets of the flow to implement the aggregation function, the conditional commands do not direct the node to store operations to update the state of the operational flow profile in the memory at the node.

11. The method of claim 9, further comprising appending, to at least one flow packet of the flow, a conditional command specifying operations to remove the state of the operational flow profile, the conditional commands not directing the node to store the operations to remove the state of the operational flow profile in the memory at the node.

12. The method of claim 9, wherein at least one flow packet of the flow includes a conditional command specifying operations to export the state of the operational flow profile, the conditional commands directing the node to store commands that specify operations to export the state of the operational flow profile in the memory at the node.

13. The method of claim 9, further comprising appending, to at least one flow packet of the flow, a conditional command specifying operations to export the state of the operational flow profile, the conditional commands not directing the node to store the operations to export the state of the operational flow profile in the memory at the node.

14. The method of claim 9, further comprising appending conditional commands to at least one flow packet of the flow that indicates the operational flow profile is applicable to one or more nodes in the network along the path of the flow.

15. The method of claim 9, wherein the aggregation function includes matching a target data item against a bucket criterion, updating a set of counters representing buckets in a histogram based on the bucket criterion, and generating the histogram based on the set of counters.

16. The method of claim 9, wherein the aggregation function measures at least one of packet data, flow telemetry, NE hardware statistics, NE hardware telemetry, or any combination thereof.

\* \* \* \* \*

UNITED STATES PATENT AND TRADEMARK OFFICE
CERTIFICATE OF CORRECTION

| | |
|---|---|
| PATENT NO. | : 12,040,990 B2 |
| APPLICATION NO. | : 16/951440 |
| DATED | : July 16, 2024 |
| INVENTOR(S) | : Alexander Clemm et al. |

It is certified that error appears in the above-identified patent and that said Letters Patent is hereby corrected as shown below:

On the Title Page

Item (71) Applicant: Delete "HUAWEI TECHNOLOGIES CO., LTD., Guangdong (CN)" and insert -- HUAWEI TECHNOLOGIES CO., LTD., Shenzhen (CN) --.

Insert -- (Continued) Related U.S. Application Data (60) Provisional application No. 62/681,527, filed on June 6, 2018 --.

Signed and Sealed this
Twentieth Day of August, 2024

Katherine Kelly Vidal
*Director of the United States Patent and Trademark Office*